(12) United States Patent
Wei et al.

(10) Patent No.: US 11,646,786 B2
(45) Date of Patent: May 9, 2023

(54) METHODS, WIRELESS COMMUNICATIONS NETWORKS AND INFRASTRUCTURE EQUIPMENT

(71) Applicant: Sony Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 254 days.

(21) Appl. No.: 17/274,186

(22) PCT Filed: Sep. 19, 2019

(86) PCT No.: PCT/EP2019/075117
§ 371 (c)(1),
(2) Date: Mar. 8, 2021

(87) PCT Pub. No.: WO2020/064486
PCT Pub. Date: Apr. 2, 2020

(65) Prior Publication Data
US 2022/0094425 A1 Mar. 24, 2022

(30) Foreign Application Priority Data
Sep. 27, 2018 (EP) ..................................... 18197358

(51) Int. Cl.
*H04B 7/155* (2006.01)
*H04W 28/02* (2009.01)
(Continued)

(52) U.S. Cl.
CPC .... *H04B 7/15542* (2013.01); *H04W 28/0278* (2013.01); *H04W 72/1268* (2013.01)

(58) Field of Classification Search
CPC ............. H04B 7/15542; H04B 7/2606; H04W 28/0278; H04W 72/1268; H04W 72/1284; H04W 84/02; H04W 88/04
See application file for complete search history.

(56) References Cited

U.S. PATENT DOCUMENTS

| | | | |
|---|---|---|---|
| 10,292,191 B2 * | 5/2019 | Sartori | H04W 72/042 |
| 2010/0061361 A1 * | 3/2010 | Wu | H04W 56/0045 370/350 |
| 2021/0195618 A1 * | 6/2021 | Yuan | H04W 72/1268 |

FOREIGN PATENT DOCUMENTS

EP 3091803 A1 11/2016

OTHER PUBLICATIONS

International Search Report and Written Opinion dated Jan. 29, 2020, received for PCT Application PCT/EP2019/075117 Filed on Sep. 19, 2019, 19 pages.

(Continued)

*Primary Examiner* — Dinh Nguyen
(74) *Attorney, Agent, or Firm* — Xsensus LLP

(57) ABSTRACT

A method of controlling communications within a wireless communications network is provided. The method comprises in advance of transmitting the data by a child node to a donor node, configuring, by one of the donor node and a parent node, a Buffer Status Report, general BSR timer for the child node, the general BSR timer being common and synchronised among at least a subset of a plurality of infrastructure equipment, receiving, at the parent node, subsequent to expiry of the general BSR timer, a signal comprising a BSR from the child node indicating an amount of uplink data that the child node has ready to transmit to the parent node, and scheduling, by the parent node, in accordance with the BSR received from the child node, communications resources of the backhaul communications link to (Continued)

the child node in which the child node is to transmit the uplink data.

20 Claims, 10 Drawing Sheets

(51) Int. Cl.
*H04W 72/12* (2023.01)
*H04W 72/1268* (2023.01)

(56) References Cited

OTHER PUBLICATIONS

Intel Corporation, "Overview on RAN1 Related Issues in Iab", 3GPP TSG RAN WG1 #92bis, R1-1804755, Apr. 16-20, 2018, pp. 1-15.
ITL, "Considerations on SL BSR for Relay UE", 3GPP TSG RAN WG2 Meeting #92, R2-156316, Nov. 16-20, 2015, pp. 1-5.
ETRI, "Consideration on MAC Procedures for Un Interface", 3GPP TSG RAN WG2 #68, R2-096497, Nov. 9-13, 2009, pp. 1-4.
AT&T, "Multi-Connectivity Architecture Design for IAB Arch. 1a", 3GPP TSG-RAN WG3 Meeting #101, R3-185153, Aug. 20-24, 2018, pp. 1-17.
Holma et al., "LTE for UMTS OFDMA and SC-FDMA Based Radio Access", Wiley and Sons, 2009, pp. 25-27.
Huawei et al., "Revised Work Item Proposal: Enhancements of NB-IoT", 3GPP TSG RAN Meeting #73, RP-161901, Sep. 19-22, 2016, 8 pages.
AT&T et al., "New SID Proposal: Study on Integrated Access and Backhaul for NR", 8881123GPP TSG RAN Meeting #75, RP-170831, Mar. 6-9, 2017, 5 pages.
3GPP, "Study on Integrated Access and Backhaul (Release 15)", TR 38.874 V0.0.2, Feb. 2018, pp. 1-11.
Qualcomm et al., "Proposals on IAB Architecture", 3GPP TSG-RAN WG2 NR Ad hoc 1801, R2-1801606, Jan. 22-26, 2018, 7 pages.
Qualcomm et al., "Way Forward—IAB Architecture for L2/3 Relaying", 3GPP TSG-RAN WG3 Meeting #99, R3-181502, Jan. 26-Mar. 2, 2018, 6 pages.
LG Electronics Inc., "Scheduling Enhancement in IAB", 3GPP TSG-RAN WG2 Meeting #103, R2-1812638, Aug. 20-24, 2018, pp. 1-2.
Huawei et al., "Pre-BSR Enabling Fast Scheduling", 3GPP TSG-RAN WG2 Meeting 103, R2-1812881, Aug. 20-24, 2018, pp. 1-3.
3GPP, "NR; Medium Access Control (MAC) Protocol Specification (Release 15)", TS 38.321 V15.2.0, Jun. 2018, pp. 1-73.
3GPP, "Study on Integrated Access and Backhaul (Release 15)", TR 38.874 V0.0.5, Oct. 2018, pp. 1-78.

\* cited by examiner

METHODS, WIRELESS COMMUNICATIONS NETWORKS AND INFRASTRUCTURE EQUIPMENT

CROSS-REFERENCE TO RELATED APPLICATIONS

The present application is based on PCT filing PCT/EP2019/075117, filed Sep. 19, 2019, which claims priority to EP 18197358.7, filed Sep. 27, 2018, the entire contents of each are incorporated herein by reference.

BACKGROUND

Field of Disclosure

The present disclosure relates to methods and apparatus for the communication of signals between various infrastructure equipment, communications devices and the core network on a wireless backhaul communications link in a wireless communications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

As radio technologies continue to improve, for example with the development of 5G, the possibility arises for these technologies to be used not only by infrastructure equipment to provide service to wireless communications devices in a cell, but also for interconnecting infrastructure equipment to provide a wireless backhaul. In view of this there is a need to ensure that a donor infrastructure equipment that is physically connected to the core network does not suffer from a "capacity crunch" when a large amount of data is being transmitted from various communications devices and infrastructure equipment to the core network via the donor infrastructure equipment.

SUMMARY OF THE DISCLOSURE

The present disclosure can help address or mitigate at least some of the issues discussed above as defined in the appended claims.

A first embodiment of the present technique can provide a method of controlling communications within a wireless communications network. The wireless communications network comprises a plurality of infrastructure equipment each being configured to communicate with one or more others of the infrastructure equipment via a backhaul communications link, one or more of the infrastructure equipment each being configured to communicate with one or more communications devices via an access link. The method comprises transmitting, to a first of the infrastructure equipment acting as a donor node connected to a core network part of the wireless communications network, data by a second of the infrastructure equipment via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the transmitting the data by the child node to the donor node, configuring, by one of the parent node or the donor node, a general Buffer Status Report BSR timer for the child node, the general BSR timer being common and synchronised among at least a subset of the plurality of infrastructure equipment, receiving, at the parent node, subsequent to expiry of the general BSR timer, a signal comprising a BSR from the child node indicating an amount of uplink data that the child node has ready to transmit to the parent node, and scheduling, by the parent node, in accordance with the BSR received from the child node, communications resources of the backhaul communications link to the child node in which the child node is to transmit the uplink data.

A second embodiment of the present technique can provide a method of controlling communications within a wireless communications network. The wireless communications network comprises a plurality of infrastructure equipment each being configured to communicate with one or more others of the infrastructure equipment via a backhaul communications link, one or more of the infrastructure equipment each being configured to communicate with one or more communications devices via an access link. The method comprises transmitting, to a first of the infrastructure equipment acting as a donor node connected to a core network part of the wireless communications network, data by a second of the infrastructure equipment via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the transmitting the data by the child node to the donor node, receiving, at the parent node, a signal comprising a Buffer Status Report, BSR from the child node indicating an amount of uplink data that the child node has ready to transmit to the parent node, and scheduling, by the parent node, in accordance with the BSR received from the child node, communications resources of the backhaul communications link to the child node in which the child node is to transmit the uplink data, wherein the signal comprising the BSR additionally comprises assistance information for the parent node, and the parent node schedules the communications resources to the child node in accordance with the BSR and the assistance information.

A third embodiment of the present technique can provide a method of controlling communications within a wireless communications network. The wireless communications network comprises a plurality of infrastructure equipment each being configured to communicate with one or more others of the infrastructure equipment via a backhaul communications link, one or more of the infrastructure equipment each being configured to communicate with one or more communications devices via an access link. The method comprises transmitting, to a first of the infrastructure equipment acting as a donor node connected to a core network part of the wireless communications network, data by a second of the infrastructure equipment via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the transmitting the data by the child node to the donor node, receiving, at the parent node, a signal comprising a Buffer Status Report, BSR from the child node indicating an amount of uplink data that the child node has ready to transmit to the parent node, and scheduling, by the parent node, in accordance with the BSR received from the child node, communications resources of the backhaul communications link to the child node in which the child node is to transmit the uplink data, wherein a buffer size value included within the BSR which indicates the amount of uplink data that the child node has ready to transmit to the parent node is inflated to a higher level than the real buffer size value of the child node.

A fourth embodiment of the present technique can provide a method of controlling communications within a wireless communications network. The wireless communications network comprises a plurality of infrastructure equipment each being configured to communicate with one or more others of the infrastructure equipment via a backhaul communications link, one or more of the infrastructure equipment each being configured to communicate with one or more communications devices via an access link. The method comprises transmitting, to a first of the infrastructure equipment acting as a donor node connected to a core network part of the wireless communications network, data by a second of the infrastructure equipment via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the transmitting the data by the child node to the donor node, transmitting, by the parent node, a signalling message comprising an indication at least some of the plurality of infrastructure equipment should transmit a Buffer Status Report, BSR, receiving, at the parent node, subsequent to the signalling message being received by the child node, a signal comprising a BSR from the child node indicating an amount of uplink data that the child node has ready to transmit to the parent node, and scheduling, by the parent node, in accordance with the BSR received from the child node, communications resources of the backhaul communications link to the child node in which the child node is to transmit the uplink data.

A fifth embodiment of the present technique can provide a method of controlling communications within a wireless communications network. The wireless communications network comprises a plurality of infrastructure equipment each being configured to communicate with one or more others of the infrastructure equipment via a backhaul communications link, one or more of the infrastructure equipment each being configured to communicate with one or more communications devices via an access link. The method comprises transmitting, to a first of the infrastructure equipment acting as a donor node connected to a core network part of the wireless communications network, data by a second of the infrastructure equipment via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the transmitting the data by the child node to the donor node, receiving, at the parent node, a signal comprising a Buffer Status Report, BSR from the child node indicating an amount of uplink data that the child node has ready to transmit to the parent node, scheduling, by the parent node, in accordance with the BSR received from the child node, communications resources of the backhaul communications link to the child node in which the child node is to transmit the uplink data, and transmitting, by each of one or more of the infrastructure equipment, based on a received pre-BSR report masking parameter, a pre-BSR to their parent nodes subsequent to receiving a BSR from their child nodes, the pre-BSR comprising an indication of a sum of an amount of uplink data the each of the one or more of the infrastructure equipment currently has to transmit and an amount of uplink data reported by its child nodes and/or one or more communications devices served by it Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
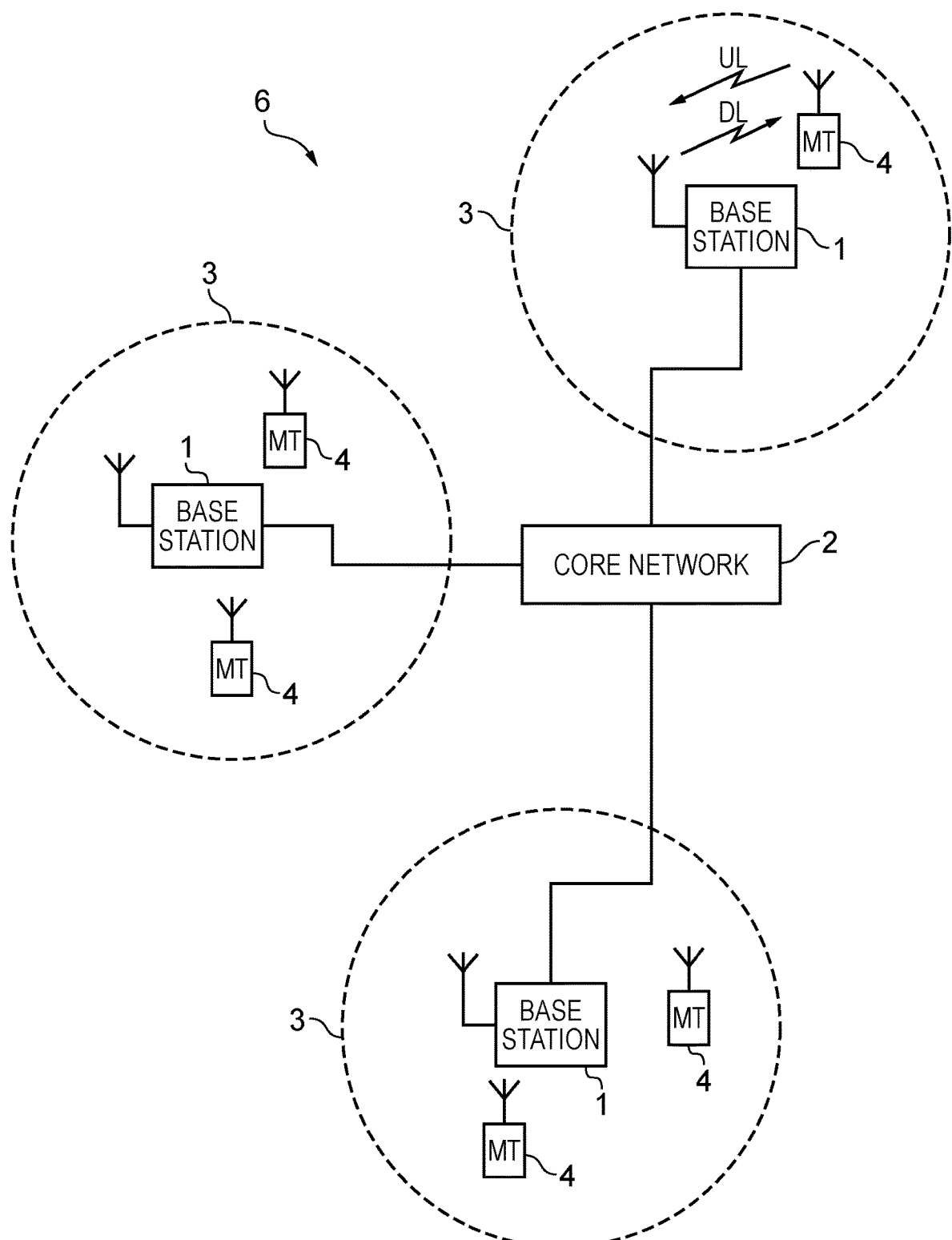
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
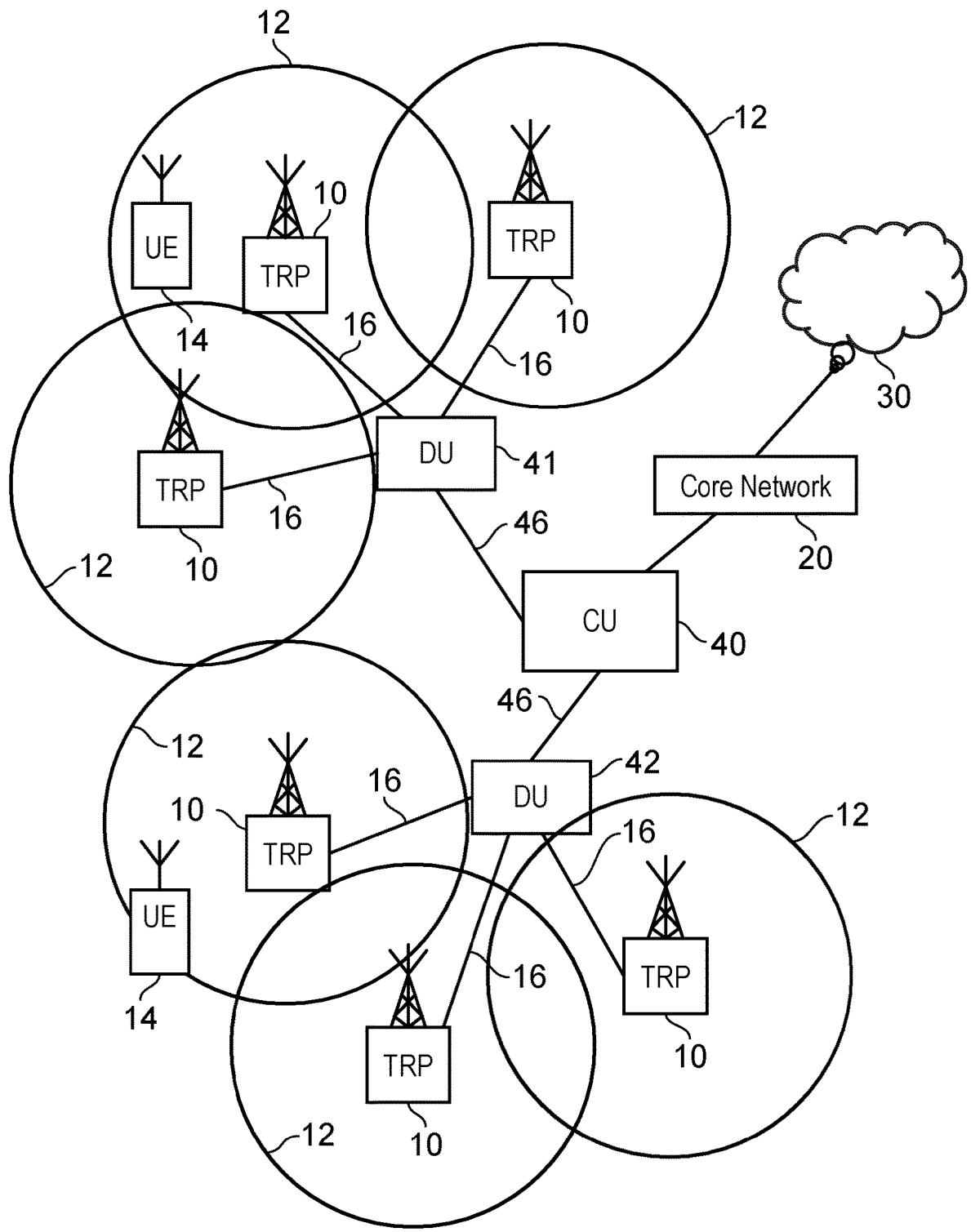
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the a core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 212 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
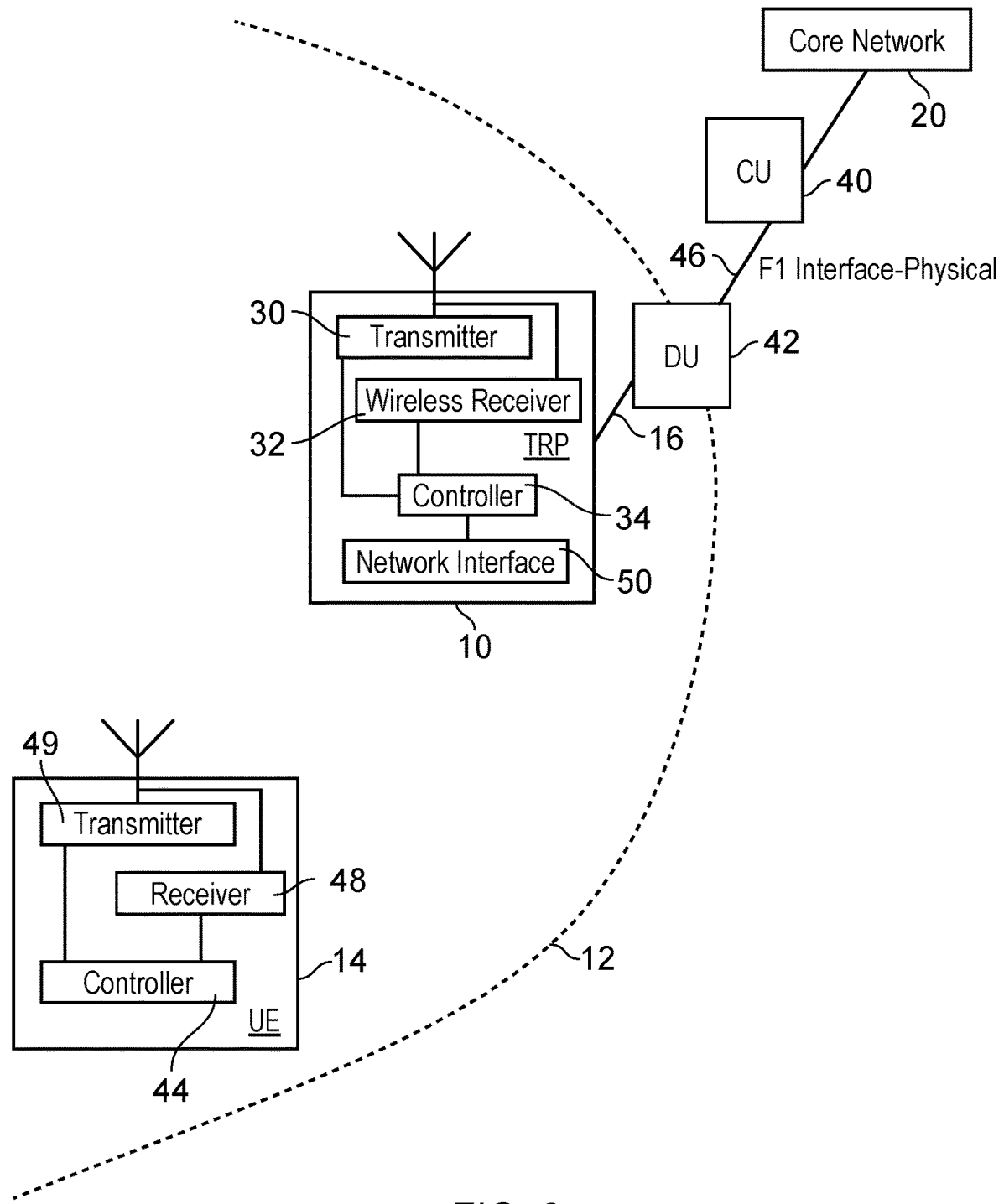
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP10 to the DU 42 and the F1 interface 46 from the DU 42 to the CU 40.

Figure 4:
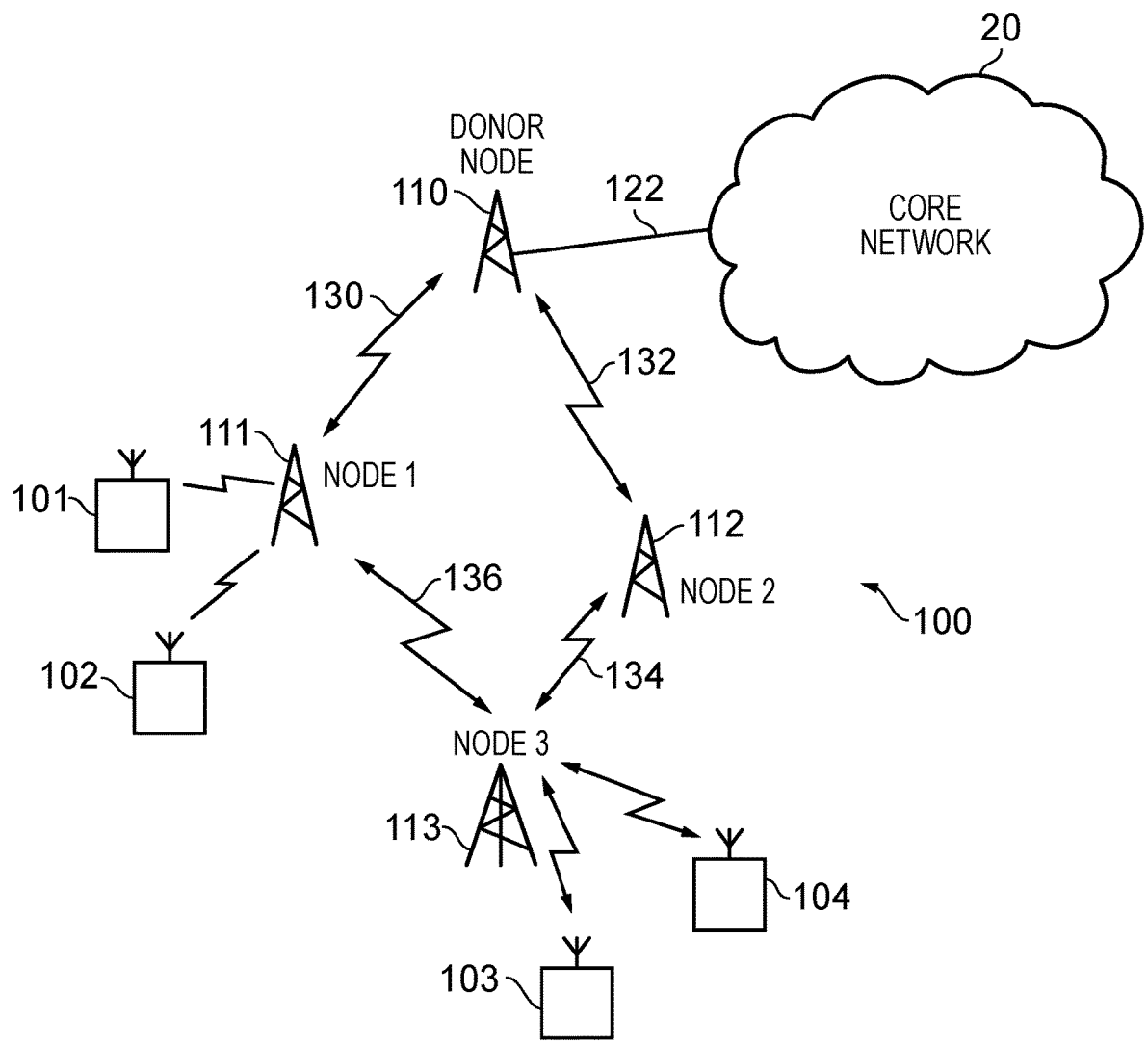
FIG. 4 schematically represents some aspects of an example wireless telecommunication network which may be configured to operate in accordance with certain embodiments of the present disclosure.

Example arrangements of the present technique can be formed from a wireless communications network corresponding to that shown in FIG. 1 or 2, as shown in FIG. 4. FIG. 4 provides an example in which cells of a wireless communications network are formed from infrastructure equipment which are provided with an Integrated Access and Backhaul (IAB) capability. The wireless communications network 100 comprises the core network 20 and a first, a second, a third and a fourth communications device (respectively 101, 102, 103 and 104) which may broadly correspond to the communications devices 4, 14 described above.

The wireless communications network 100 comprises a radio access network, comprising a first infrastructure equipment 110, a second infrastructure equipment 111, a third infrastructure equipment 112, and a fourth infrastructure equipment 113. Each of the infrastructure equipment provides a coverage area (i.e. a cell, not shown in FIG. 4) within which data can be communicated to and from the communications devices 101 to 104. For example, the fourth infrastructure equipment 113 provides a cell in which the third and fourth communications devices 103 and 104 may obtain service. Data is transmitted from the fourth infrastructure equipment 113 to the fourth communications device 104 within its respective coverage area (not shown) via a radio downlink. Data is transmitted from the fourth communications device 104 to the fourth infrastructure equipment 113 via a radio uplink.

The infrastructure equipment 110 to 113 in FIG. 4 may correspond broadly to the TRPs 10 of FIG. 2 and FIG. 3.

The first infrastructure equipment 110 in FIG. 4 is connected to the core network 20 by means of one or a series of physical connections. The first infrastructure equipment 110 may comprise the TRP 10 (having the physical connection 16 to the DU 42) in combination with the DU 42 (having a physical connection to the CU 40 by means of the F1 interface 46) and the CU 40 (being connected by means of a physical connection to the core network 20).

However, there is no direct physical connection between any of the second infrastructure equipment 111, the third infrastructure equipment 112, and the fourth infrastructure equipment 113 and the core network 20. As such, it may be necessary (or, otherwise determined to be appropriate) for data received from a communications device (i.e. uplink data), or data for transmission to a communications device (i.e. downlink data) to be transmitted to or from the core network 20 via other infrastructure equipment (such as the first infrastructure equipment 110) which has a physical connection to the core network 20, even if the communications device is not currently served by the first infrastructure equipment 110 but is, for example, in the case of the wireless communications device 104, served by the fourth infrastructure equipment 113.

The second, third and fourth infrastructure equipment 111 to 113 in FIG. 4 may each comprise a TRP, broadly similar in functionality to the TRPs 10 of FIG. 2.

In some arrangements of the present technique, one or more of the second to fourth infrastructure equipment 111 to 113 in FIG. 4 may further comprise a DU 42, and in some arrangements of the present technique, one or more of the second to fourth infrastructure equipment 110 to 113 may comprise a DU and a CU.

In some arrangements of the present technique, the CU 40 associated with the first infrastructure equipment 110 may perform the function of a CU not only in respect of the first infrastructure equipment 110, but also in respect of one or more of the second, the third and the fourth infrastructure equipment 111 to 113.

In order to provide the transmission of the uplink data or the downlink data between a communications device and the core network, a route is determined by any suitable means, with one end of the route being an infrastructure equipment physically connected to a core network and by which uplink and downlink traffic is routed to or from the core network.

In the following, the term 'node' is used to refer to an entity or infrastructure equipment which forms a part of a route for the transmission of the uplink data or the downlink data.

An infrastructure equipment which is physically connected to the core network and operated in accordance with an example arrangement may provide communications resources to other infrastructure equipment and so is referred to as a 'donor node'. An infrastructure equipment which acts as an intermediate node (i.e. one which forms a part of the route but is not acting as a donor node) is referred to as a 'relay node'. It should be noted that although such intermediate node infrastructure equipment act as relay nodes on the backhaul link, they may also provide service to communications devices. The relay node at the end of the route which is the infrastructure equipment controlling the cell in which the communications device is obtaining service is referred to as an 'end node'.

In the wireless network illustrated in FIG. 4, each of the first to fourth infrastructure equipment 110 to 113 may therefore function as nodes. For example, a route for the transmission of uplink data from the fourth communications device 104 may consist of the fourth infrastructure equipment 113 (acting as the end node), the third infrastructure equipment 112 (acting as a relay node), and the first infrastructure equipment 110 (acting as the donor node). The first infrastructure 110, being connected to the core network 20, transmits the uplink data to the core network 20.

For clarity and conciseness in the following description, the first infrastructure equipment 110 is referred to below as the 'donor node', the second infrastructure equipment 111 is referred to below as 'Node 1', the third infrastructure equipment 112 is referred to below as 'Node 2' and the fourth infrastructure equipment 113 is referred to below as 'Node 3'.

For the purposes of the present disclosure, the term 'upstream node' is used to refer to a node acting as a relay node or a donor node in a route, which is a next hop when used for the transmission of data via that route from a wireless communications device to a core network. Similarly, 'downstream node' is used to refer to a relay node from which uplink data is received for transmission to a core network. For example, if uplink data is transmitted via a route comprising (in order) the Node 3 113, the Node 1 111 and the donor node 110, then the donor node 110 is an upstream node with respect to the Node 1 111, and the Node 3 113 is a downstream node with respect to the Node 1 111.

More than one route may be used for the transmission of the uplink/downlink data from/to a given communications device; this is referred to herein as 'multi-connectivity'. For example, the uplink data transmitted by the wireless communications device 104 may be transmitted either via the Node 3 113 and the Node 2 112 to the donor node 110, or via the Node 3 113 and the Node 1 111 to the donor node 110.

In the following description, example arrangements are described in which each of the nodes is an infrastructure equipment; the present disclosure is not so limited. A node may comprise at least a transmitter, a receiver and a controller. In some arrangements of the present technique, the functionality of a node (other than the donor node) may be carried out by a communications device, which may be the communications device 4 (of FIG. 1) or 14 (of FIG. 2), adapted accordingly. As such, in some arrangements of the present technique, a route may comprise one or more communications devices. In other arrangements, a route may consist of only a plurality of infrastructure equipment.

In some arrangements of the present technique, an infrastructure equipment acting as a node may not provide a wireless access interface for the transmission of data to or by a communications device other than as part of an intermediate transmission along a route.

In some arrangements of the present technique, a route is defined considering a wireless communications device (such as the wireless communications device 104) as the start of a route. In other arrangements a route is considered to start at an infrastructure equipment which provides a wireless access interface for the transmission of the uplink data by a wireless communications device.

Each of the first infrastructure equipment acting as the donor node 110 and the second to fourth infrastructure equipment acting as the Nodes 1-3 111-113 may communicate with one or more other nodes by means of an inter-node wireless communications link, which may also be referred to as a wireless backhaul communications links. For example, FIG. 4 illustrates four inter-node wireless communications links 130, 132, 134, 136.

Each of the inter-node wireless communications links 130, 132, 134, 136 may be provided by means of a respective wireless access interface. Alternatively, two or more of the inter-node wireless communications links 130, 132, 134, 136 may be provided by means of a common wireless access interface and in particular, in some arrangements of the present technique, all of the inter-node wireless communications links 130, 132, 134, 136 are provided by a shared wireless access interface.

A wireless access interface which provides an inter-node wireless communications link may also be used for communications between an infrastructure equipment (which may be a node) and a communications device which is served by the infrastructure equipment. For example, the fourth wireless communications device 104 may communicate with the infrastructure equipment Node 3 113 using the wireless access interface which provides the inter-node wireless communications link 134 connecting the Node 3 113 and the Node 2 112.

The wireless access interface(s) providing the inter-node wireless communications links 130, 132, 134, 136 may operate according to any appropriate specifications and techniques. In some arrangements of the present technique, a wireless access interface used for the transmission of data from one node to another uses a first technique and a wireless access interface used for the transmission of data between an infrastructure equipment acting as a node and a communications device may use a second technique different from the first. In some arrangements of the present technique, the wireless access interface(s) used for the transmission of data from one node to another and the wireless access interface(s) used for the transmission of data between an infrastructure equipment and a communications device use the same technique.

Examples of wireless access interface standards include the third generation partnership project (3GPP)-specified GPRS/EDGE ("2G"), WCDMA (UMTS) and related standards such as HSPA and HSPA+ ("3G"), LTE and related standards including LTE-A ("4G"), and NR ("5G"). Techniques that may be used to provide a wireless access interface include one or more of TDMA, FDMA, OFDMA, SC-FDMA, CDMA. Duplexing (i.e. the transmission over a wireless link in two directions) may be by means of frequency division duplexing (FDD) or time division duplexing (TDD) or a combination of both.

In some arrangements of the present technique, two or more of the inter-node wireless communications links 130, 132, 134, 136 may share communications resources. This may be because two or more of the inter-node wireless communications links 130, 132, 134, 136 are provided by means of a single wireless access interface or because two or more of the inter-node wireless communications links 130, 132, 134, 136 nevertheless operate simultaneously using a common range of frequencies.

The nature of the inter-node wireless communications links 130, 132, 134, 136 may depend on the architecture by which the wireless backhaul functionality is achieved.

Integrated Access and Backhaul (IAB) for NR

A new study item on Integrated Access and Backhaul for NR [3] has been approved. Several requirements and aspects for the integrated access and wireless backhaul for NR to address are discussed in [3], which include:

Efficient and flexible operation for both inband and outband relaying in indoor and outdoor scenarios;
Multi-hop and redundant connectivity;
End-to-end route selection and optimisation;
Support of backhaul links with high spectral efficiency;
Support of legacy NR UEs.

The stated objective of the study detailed in [3] is to identify and evaluate potential solutions for topology management for single-hop/multi-hop and redundant connectivity, route selection and optimisation, dynamic resource allocation between the backhaul and access links, and achieving high spectral efficiency while also supporting reliable transmission.

Figure 5:
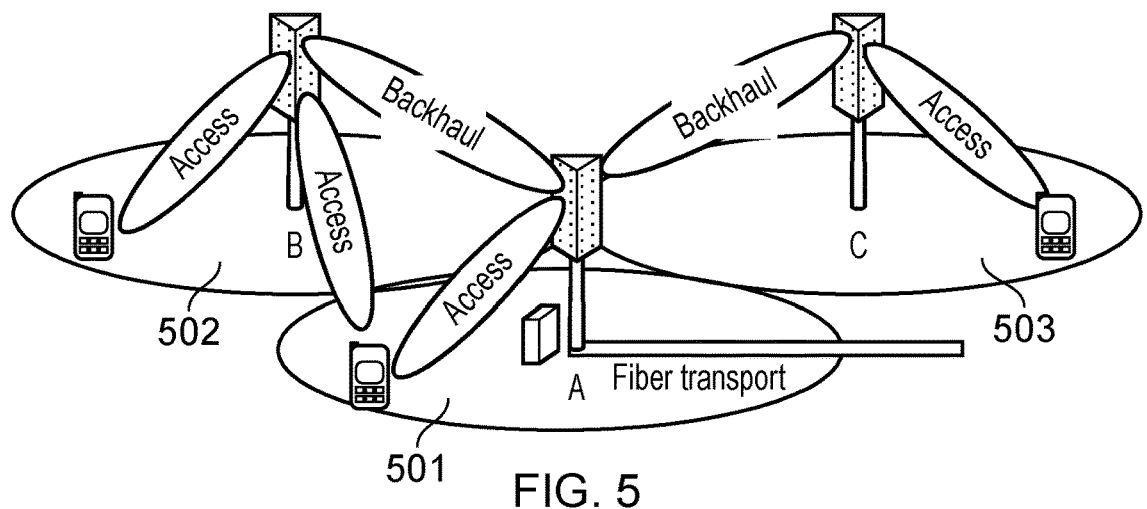
FIG. 5 is reproduced from [3], and provides a first example of an Integrated Access and Backhaul (IAB) deployment scenario.

FIG. 5 shows the scenario presented in [3], where a backhaul link is provided from cell site A 501 to cells B 502 and C 504 over the air. It is assumed that cells B 502 and C 504 have no wired backhaul connectivity. Considering the CU/DU split architecture in NR as described above, it can be assumed that all of cells A 501, B 502 and C 504 have a dedicated DU unit and are controlled by the same CU.

Several architecture requirements for IAB are laid out in [4]. These include the support for multiple backhaul hops, that topology adaptation for physically fixed relays shall be supported to enable robust operation, minimisation of impact to core network specifications, consideration of impact to core networking signalling load, and Release 15 NR specifications should be reused as much as possible in the design of the backhaul link, with enhancements considered.

Figure 6A:
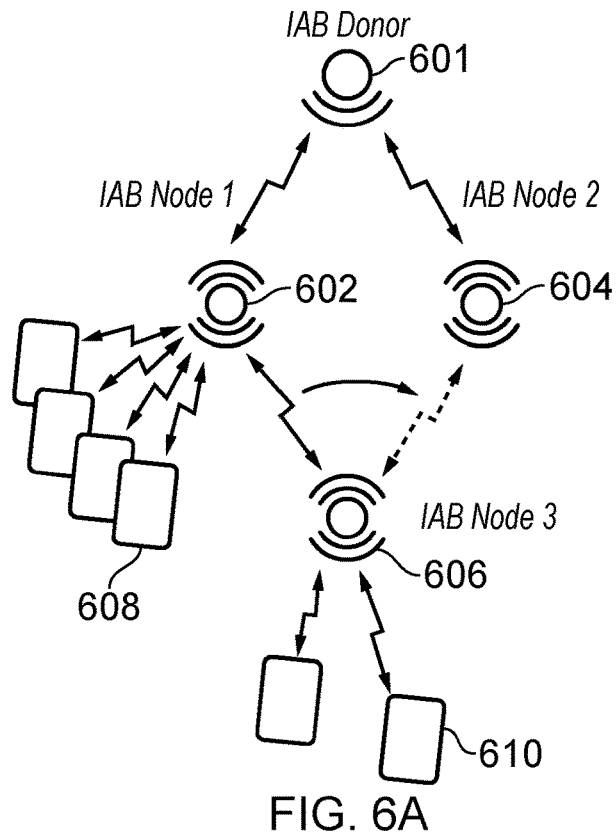
FIG. 6A is reproduced from [5], and provides a second example of an IAB deployment scenario in which there are multiple candidate routes each comprising multiple hops from the end node to the donor node.

FIG. 6A is reproduced from [5], and shows an example of a wireless communications system comprising a plurality of IAB-enabled nodes, which may for example be TRPs forming part of an NR network. These comprise an IAB donor node 601 which has a connection to the core network, two IAB nodes (a first IAB node 602 and a second IAB node 604) which have backhaul connections to the IAB donor node 601, and a third IAB node 606 (or end IAB node) which has a backhaul connection to each of the first IAB node 602 and the second IAB node 604. Each of the first IAB node 601 and third IAB node 606 have wireless access connections to UEs 608 and 610 respectively. As shown in FIG. 6A, originally the third IAB node 606 may communicate with the IAB donor node 601 via the first IAB node 602. After the second IAB node 604 emerges, there are now two candidate routes from the third IAB node 606 to the IAB donor node 601; via the first IAB node 602 and via the new second IAB node 604. The new candidate route via the second IAB node 604 will play an important role when there is a blockage in the first IAB node 602 to IAB donor node 604 link. Hence, knowing how to manage the candidate routes efficiently and effectively is important to ensure timely data transmission between relay nodes, especially when considering the characteristics of wireless links.

In the case that the link between the first IAB node 602 and the third IAB node 606 is deteriorating, or the first IAB node 602 becomes overloaded, one of the nodes in the system (this could be the donor node 601 or the first IAB node 602 itself) will need to make a decision to change the route from the third IAB node 606 to the IAB donor node 601 from that via the first IAB node 602 to that via the second IAB node 604.

In FIG. 6A, only the IAB Donor gNB 601 has a fixed line backhaul into the core network. It should be assumed in this case that the traffic from all the UEs 610 within the third IAB node's 606 coverage is backhauled firstly to the first IAB node 602. This backhaul link must compete for capacity on the component carrier serving the first IAB Node 602 with all the UEs 608 within the coverage area of the first IAB Node 602. In the relevant art, the first IAB Node 602 in such a system as that of FIG. 6A is called a "hop"—it relays communications between the end (third) IAB node 606 and the donor IAB node 601. The backhaul link to the first IAB Node 602 requires enough capacity to support the traffic from all the UEs 610, bearing in mind that some of these may have stringent quality of service (QoS) requirements that translate into high traffic intensities.

Figure 6B:
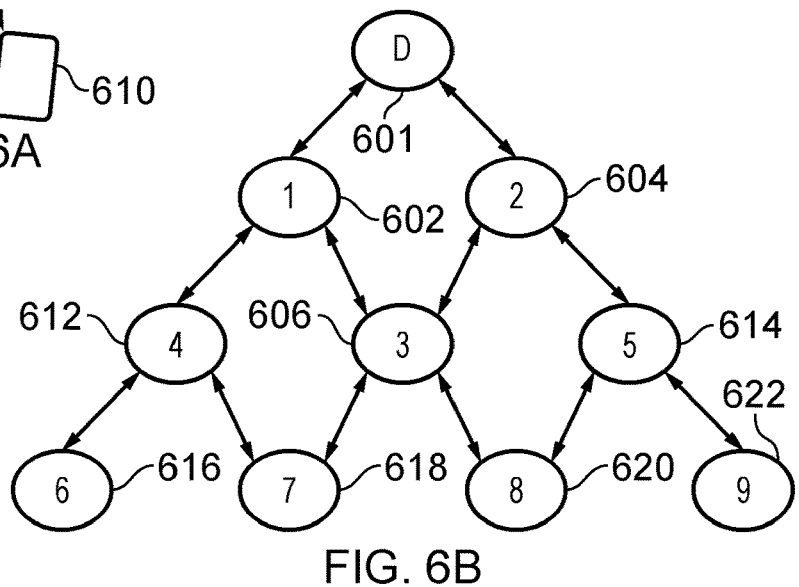
FIG. 6B is an extended version of FIG. 6A, providing a third example of an IAB deployment scenario in which there are multiple candidate routes each comprising multiple hops from the end node to the donor node.

FIG. 6B is an extended version of FIG. 6A, and shows what happens when there are multiple layers of IAB nodes in the deployment scenario. In the example of FIG. 6A, the third IAB node 606 is the child node of the first IAB node 602, and the first IAB node 602 may be the parent node of the third IAB node 606. However, a parent node may not necessarily be the next node up (i.e. one hop in the uplink direction) towards the IAB donor node 601. A parent node may be more than one hop away from its child node or children nodes, and is in a general sense configured to allocate uplink communications resources to the child node. For example, the donor IAB node 601 may in fact be the parent node of the third IAB node 606. This is shown with greater clarity in FIG. 6B.

In FIG. 6B, in addition to IAB node 601, 602, 604 and 606 as shown in FIG. 6A, there are additional IAB nodes 612 and 614 at the same layer or level of the network as IAB node 606. Below these are IAB nodes 616, 618, 620 and 622, which are now end nodes, in that they have no downlink backhaul connections to other IAB nodes. Here, it could be that the first IAB node 602 is still the parent of the third IAB node 606, but may also be the parent of IAB node 612. Further, the first IAB node 602 may be the parent of IAB nodes 616, 618 and 620 too, or may be a grandparent node to these nodes if nodes 606 and 612 are their parents.

Various architectures have been proposed in order to provide the IAB functionality. The below described embodiments of the present technique are not restricted to a particular architecture. However, a number of candidate architectures which have been considered in, for example, 3GPP document [6] are described below.

Figure 7:
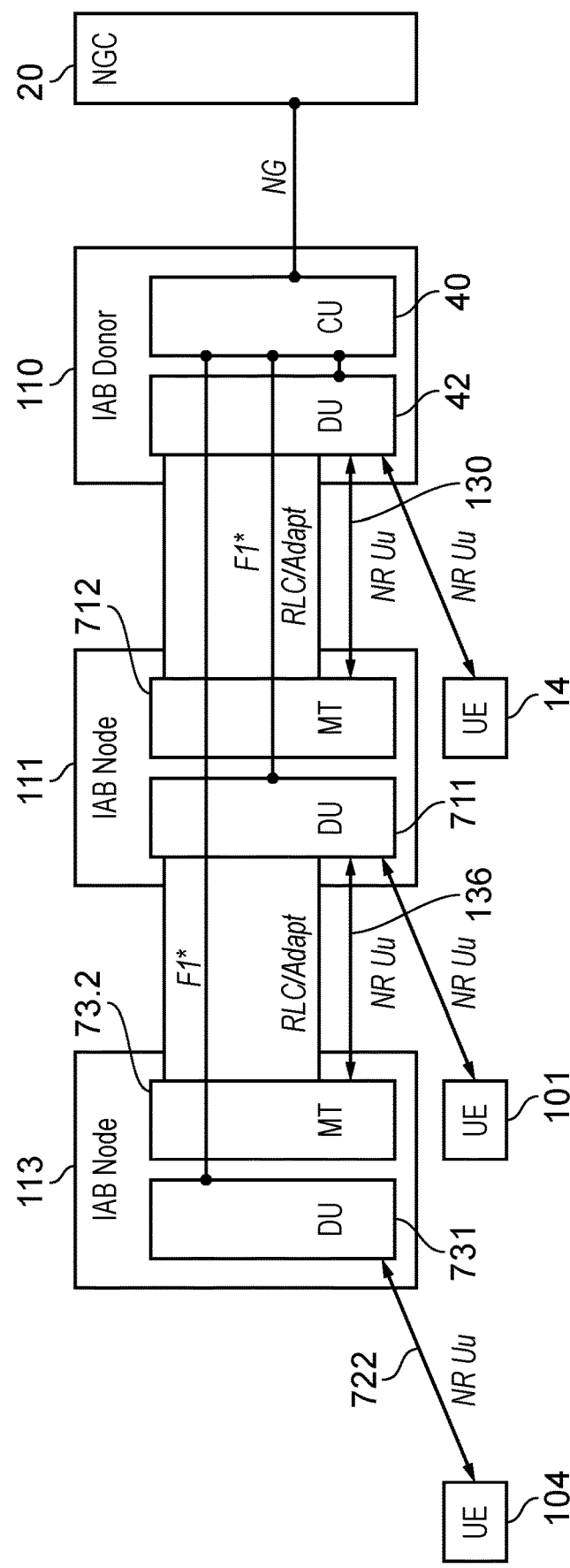
FIG. 7 is a block diagram illustrating a first possible network architecture for providing a wireless backhaul by means of IAB in a wireless telecommunication network which may be configured to operate in accordance with certain embodiments of the present disclosure.

FIG. 7 illustrates one possible architecture, sometimes referred to as "Architecture 1a", by which the donor Node 110, the Node 1 111 and the Node 3 113 may provide a wireless backhaul to provide connectivity for the UEs 104, 101, 14.

In FIG. 7, each of the infrastructure equipment acting as an IAB nodes 111, 113 and the donor node 110, includes a distributed unit (DU) 42, 711, 731 which communicates with the UEs 14, 101, 104 and (in the case of the DUs 42, 511 associated with the donor node 110 and the Node 1 111) with the respective downstream IAB nodes 111, 113. Each of the IAB nodes 111, 113 (not including the donor node 110) includes a mobile terminal (MT) 712, 732, which includes a transmitter and receiver (not shown) for transmitting and receiving data to and from the DU of an upstream IAB node and an associated controller (not shown). The inter-node wireless communications links 130, 136 may be in the form of new radio (NR) "Uu" wireless interface. The mobile terminals 712, 732 may have substantially the same functionality as a UE, at least at the access stratum (AS) layer. Notably, however, an MT may not have an associated subscriber identity module (SIM) application; a UE may be conventionally considered to be the combination of an MT and a SIM application.

The Uu wireless interfaces used by IAB nodes to communicate with each other may also be used by UEs to transmit and receive data to and from the DU of the upstream IAB node. For example, the Uu interface 720 which is used by the Node 1 111 for communication with the donor node 110 may also be used by the UE 14 to transmit and receive data to and from the donor node 110.

Similarly, an end node (such as the Node 3 113) may provide a Uu wireless interface 722 for the fourth UE 104 to communicate with the DU 731 of the Node 3 113.

Figure 8:
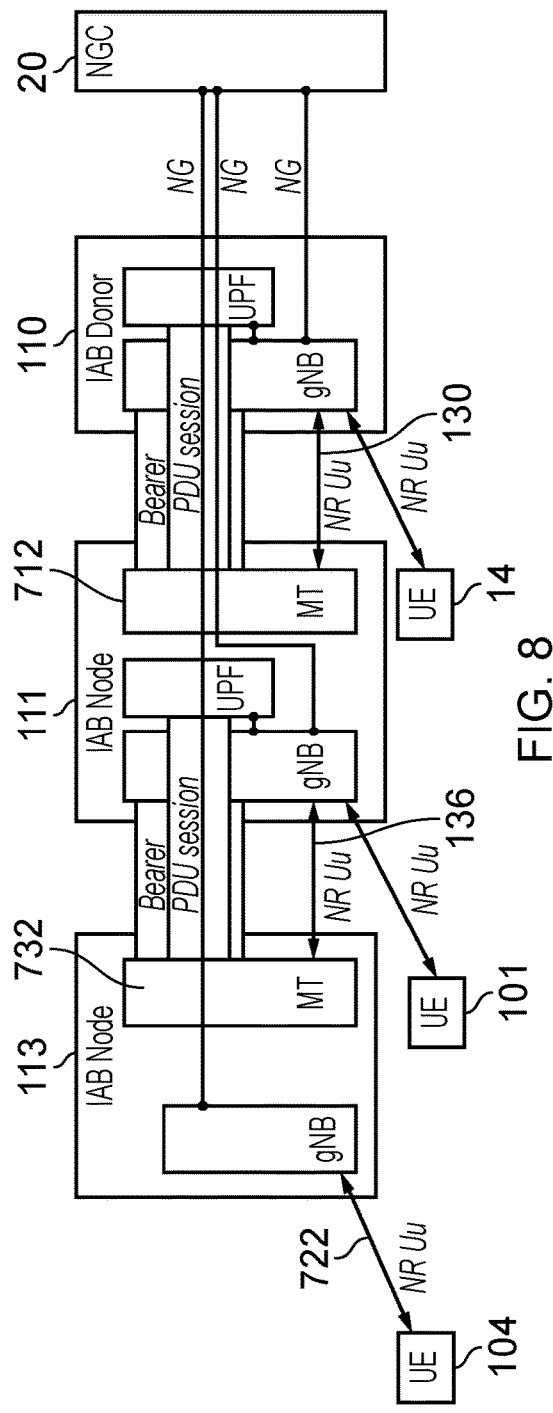
FIG. 8 is a block diagram illustrating a second possible network architecture for providing a wireless backhaul by means of IAB in a wireless telecommunication network which may be configured to operate in accordance with certain embodiments of the present disclosure.
Figure 9:
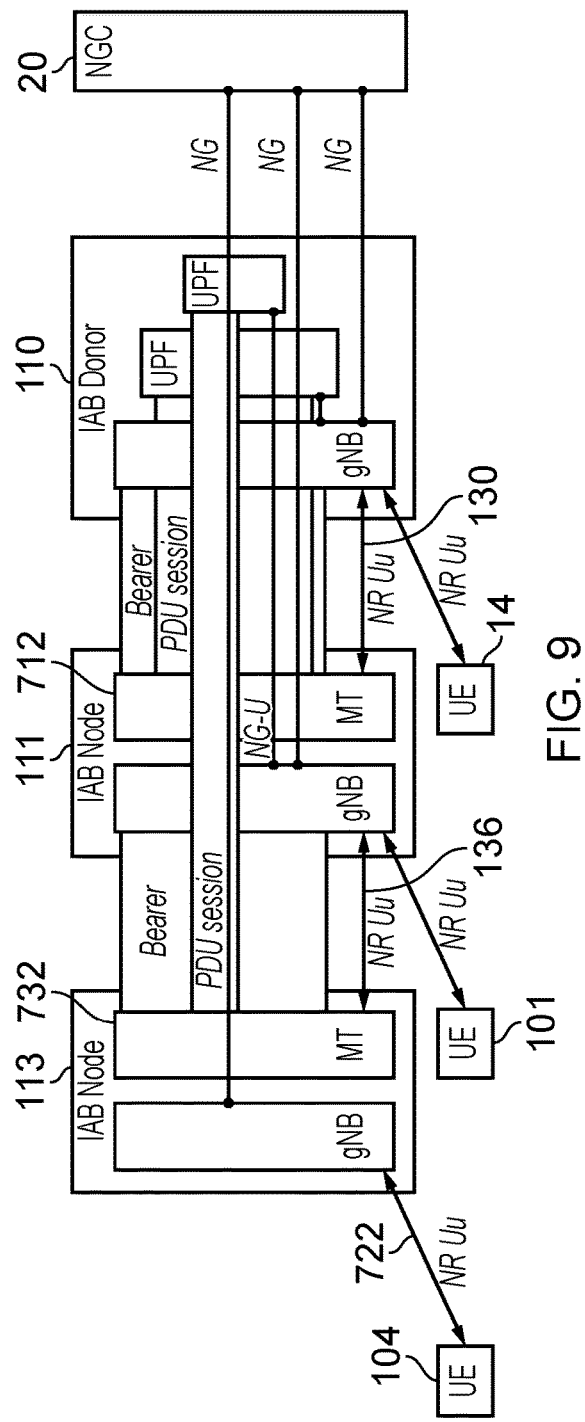
FIG. 9 is a block diagram illustrating a third possible network architecture for providing a wireless backhaul by means of IAB in a wireless telecommunication network which may be configured to operate in accordance with certain embodiments of the present disclosure.

Alternative candidate architectures for the provision of IAB are provided in FIG. 8 and FIG. 9, sometimes referred to as "Architectures 2a and 2b" respectively. In both FIG. 8 and FIG. 9, each IAB node includes a gNB function, providing a wireless access interface for the use of downstream IAB nodes and wireless communications devices.

FIG. 9 differs from FIG. 7 in that, in FIG. 7, Protocol Data Unit (PDU) sessions are connected end-on-end to form the wireless backhaul; in FIG. 9, PDU sessions are encapsulated so that each IAB node may establish an end-to-end PDU session which terminates at the IAB donor node 110.

Figure 10:
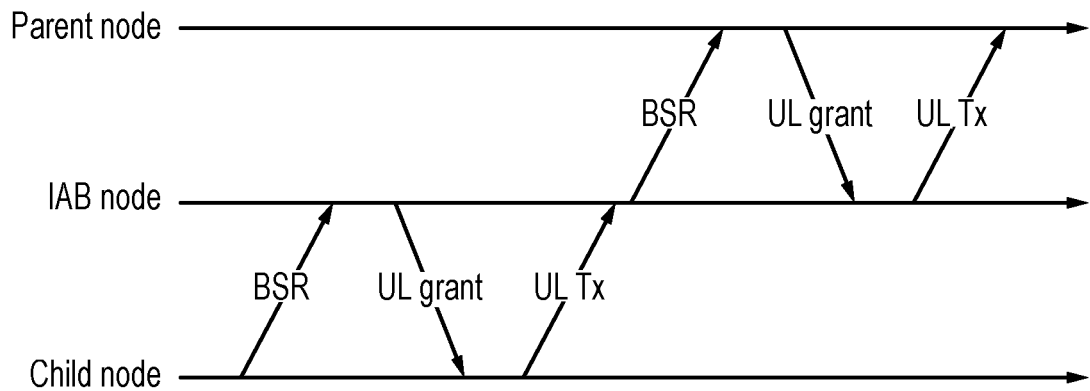
FIG. 10 is reproduced from [7], and illustrates a first example of cascade scheduling in IAB.

The manner in which resources are scheduled between IAB nodes can have a big impact on the efficiency of IAB networks. One example of a known scheduling technique is cascade scheduling, in which an IAB node will be allocated an uplink grant from its upstream IAB node after receiving data from its downstream IAB node(s). Clearly, this has advantages in terms of resource saving, as the upstream node knows how much data it needs to send on the uplink. However, as is indicated in [7], and illustrated in FIG. 10, cascade scheduling provides a significant disadvantage in that it increases the end-to-end data transmission delay. This is because the nodes at each hop level must wait to receive data from their downstream node(s) before sending a Buffer Status Report (BSR) to their upstream node, which will then allocate them resources on that basis, and only then can the nodes transmit that data received from their downstream nodes onwards. This situation will cause the end-to-end data transmission delay and network efficiency to deteriorate even further as the number of hops from end node to donor node increase.

Figure 11:
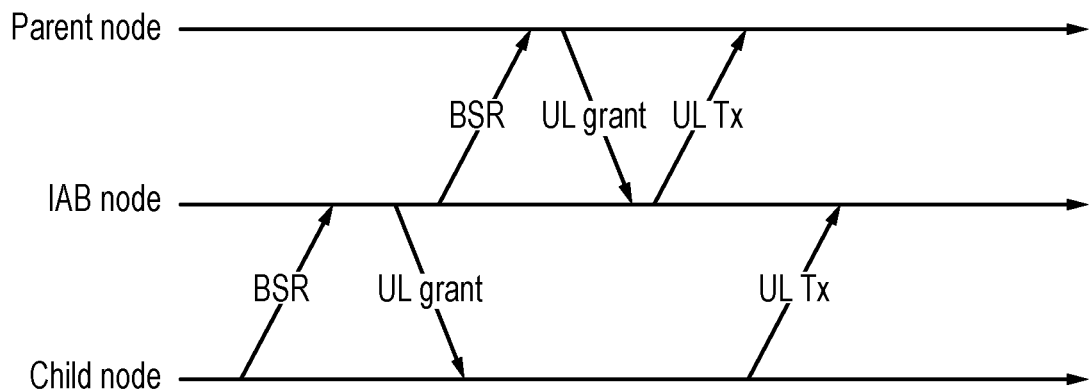
FIG. 11 is reproduced from [7], and illustrates a second example of cascade scheduling in IAB.

In [7], it is proposed that an IAB node can trigger a BSR when the IAB node schedules resources for its child node, and sends a BSR to its parent node by only considering the amount of data it has itself scheduled instead of the amount of data reported from the child nodes in their BSRs. However, it can be envisaged that this proposed technique may result in a waste of uplink resources in a case, demonstrated in FIG. 11, where a parent node allocates an uplink grant to an intermediate node, where the uplink grant is before the data from the child node of this intermediate node arrives at the intermediate node. Clearly then, such an uplink grant allocated by the parent node to the intermediate node will be wasted (e.g. may be skipped or padded), and another BSR may need to be triggered upon the arrival of data. In order to overcome this disadvantage, the remedy measure proposed in [7] to introduce the provision of scheduling timing information by an IAB node to its parent node when sending a BSR, will increase the signalling overhead as well as coordination complexity.

In [8], it is proposed that an IAB node will trigger a BSR (termed a "pre-BSR") once a BSR is received from a downstream IAB node or a UE served by the DU part of this IAB node. It is proposed in one example that the MAC CE used for standard BSRs can be reused for the pre-BSR, while the data volume is the sum of the actual amount of data the IAB node currently has and the data volume reported by its downstream IAB nodes or UEs served by it. However, this proposal could also result in resource wastage, as the BSR may not necessarily indicate a data volume equal to the data that the downstream node is going to transmit. Furthermore, this proposal also has the same problem as the solution proposed in [7], in that signalling overhead and coordination complexity will each be increased.

Given the vulnerable characteristics of wireless links, and considering the existence of multi-hops on the backhaul link, topology adaptation should be considered in the case that blockages or congestion occur in the backhaul link considering a given hop. Such blockages or congestion, on any nodes on a route from donor node to end node, will further increase end-to-end delays. It is therefore imperative to maximise the spectral efficiency of the backhaul link in order to maximise its capacity. Methods which seek to support route change procedures in a fast and efficient manner are one direction to ease problems when, for example, blockage or overflow occurs at some IAB nodes in the system. Embodiments of the present technique seek to provide other solutions to such a problem, whereby resources are scheduled by parent or upstream nodes to their child or downlink nodes in a more efficient manner.

BSR Enhancement in IAB

Figure 12:
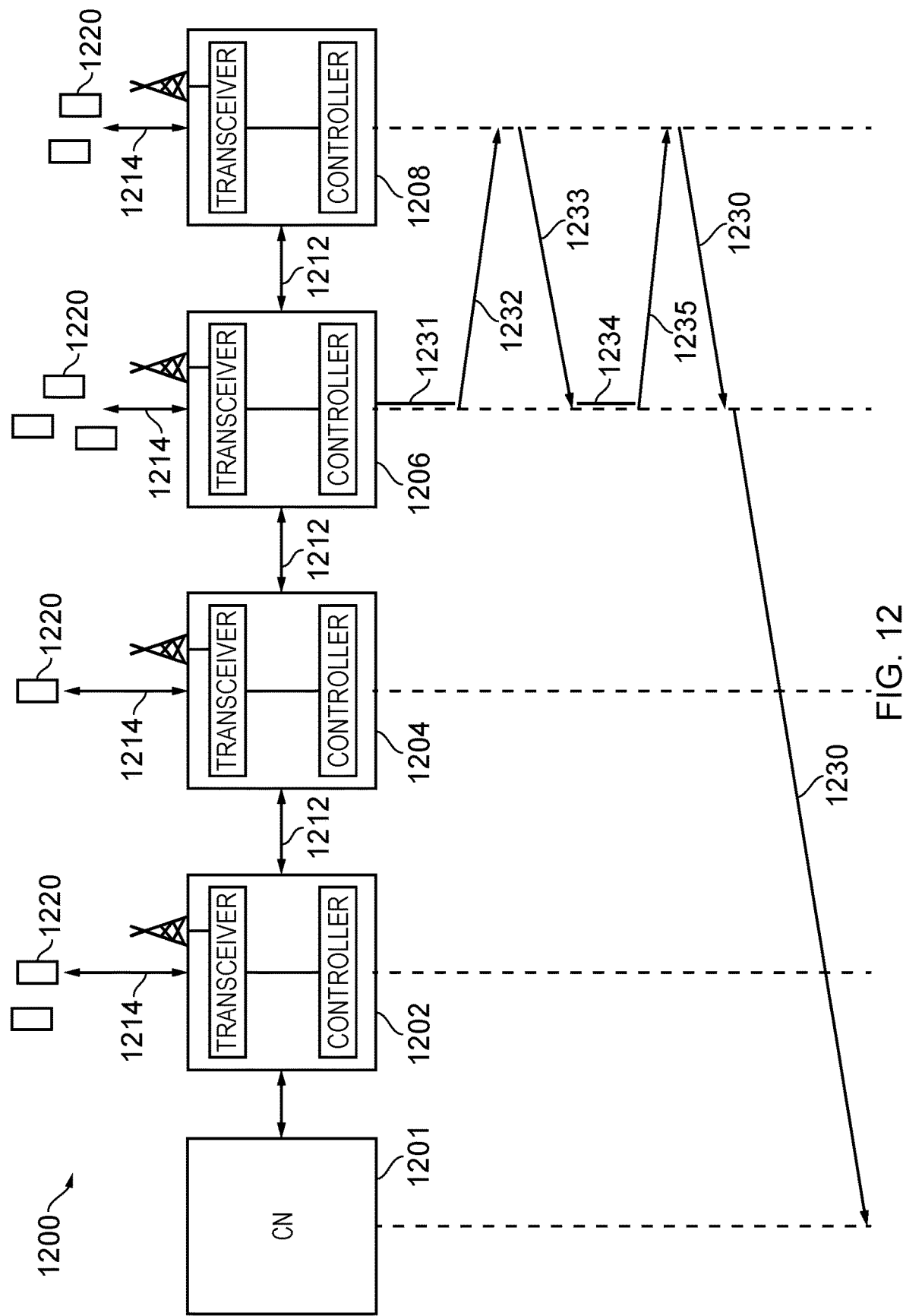
FIG. 12 shows a part schematic, part message flow diagram of communications in a wireless communications system in accordance with embodiments of the present technique.

FIG. 12 shows a part schematic, part message flow diagram of communications in a wireless communications network 1200 in accordance with embodiments of the present technique. The wireless communications network 1200 comprises a plurality of infrastructure equipment 1202, 1204, 1206, 1208 each being configured to communicate with one or more others of the infrastructure equipment 1202, 1204, 1206, 1208 via a backhaul communications link 1212, one or more of the infrastructure equipment 1202, 1204, 1206, 1208 each being configured to communicate with one or more communications devices 1220 via an access link 1214. A second of the infrastructure equipment 1208 is configured to transmit 1230, to a first of the infrastructure equipment 1202 acting as a donor node connected to a core network part 1201 of the wireless communications network 1200, data via one or more others of the infrastructure equipment acting as relay nodes 1206, the second infrastructure equipment 1208 being a child node and one of the one or more other infrastructure equipment acting as the relay nodes 1206 or the donor node 1202 being a parent node to which the child node 1208 is attached, the parent node 1206 being configured to allocate uplink communications resources to the child node 1208. FIG. 12 shows the infrastructure equipment 1206 as the relaying infrastructure equipment and the parent node, but those skilled in the art would understand that the infrastructure equipment 1204 (or another intermediate IAB which is not shown) may equally be either or both of the relaying node or parent node, or the first infrastructure equipment 1202 may be the parent node. The parent node 1206 (or the donor node 1202) is configured, in advance of the transmitting 1230 the data by the child node 1208 to the donor node 1202, to configure 1231 a general Buffer Status Report, BSR, timer for the child node 1208, the general BSR timer being common and synchronised among at least a subset of the plurality of infrastructure equipment 1202, 1204, 1206, 1208. This step may then be followed by the parent node 1206 transmitting the general BSR timer to the child node 1208 following its configuration. This configuration 1231 and transmission 1232 of the general BSR timer may take place upon the child node 1208 first attaching to the parent node 1206, or may take place at a later time designated by either of the parent node 1206 or the donor node 1202, for example. The parent node 1206 is then configured to receive 1233, subsequent to expiry of the general BSR timer, a signal comprising a BSR from the child node 1208 indicating an amount of uplink data that the child node 1208 has ready to transmit to the parent node, and to schedule 1234, in accordance with the BSR received from the child node 1208, communications resources of the backhaul communications link to the child node 1208 in which the child node 1208 is to transmit the uplink data. These scheduled communications resources 1234 may then be indicated to the child node 1208 in an uplink grant transmitted 1235 by the parent node 1206 to the child node 1208.

Essentially, as described above by way of the example of FIG. 12, embodiments of the present technique introduce a synchronised period timer (general BSR timer) that can be configured among some or all of the IAB nodes in an IAB network. If this the timer expires, all of the IAB nodes with the general BSR timer configured which have uplink data available for transmission will report a BSR to their respective parent nodes. Then, the parent nodes will adjust the uplink grant allocation for their respective child nodes accordingly.

Generally, buffer status reports (BSRs) are used to provide the serving gNodeB with information about uplink data volume in the MAC entity. They can be triggered either by the arrival of new data, or by a timer. In known systems, each IAB node may be configured with an independent timer (e.g. periodicBSR-Timer), and when this timer expires, the MAC entity will send a BSR (which may be either a Long BSR or a Short BSR) accordingly. In NR, periodicBSR-Timer is configured by the RRC layer, so in principle each node could be configured with different values. However, in the IAB scenario, having such independent timers triggering BSRs may not be helpful in giving upstream nodes an overall picture of its child node's buffer status as well as uplink grant allocations. Hence, there is a need—addressed by embodiments of the present technique—to configure a new general timer for some or all of the IAB nodes in order to trigger them to send a BSR at substantially the same time, in order to present a global buffer status to upstream nodes.

As described above with respect to FIGS. 7 to 9, different IAB architectures are proposed. Depending on the architecture, embodiments of the present technique may require slightly different procedures (i.e. message flows). As described above with relation to FIG. 6B, the parent node may be one of the intermediate nodes between the child node and the donor node and may configure the timer for the child node when the child node attaches to it (this would be the case in architecture 2a as shown in FIG. 8). Alternatively, the "parent node" may be the donor node itself and it is the donor node which may configure the timer for the child node when the child node attaches to it (this would be the case in architecture 1a as shown in FIG. 7). In either case, such a timer configuration may be indicated to the child node using Radio Resource Control (RRC) signalling which indicates the timer value/length of the timer, i.e. how much time is left before a BSR should be sent (for the first BSR to be sent after initialisation, it should be noted that the RRC signalling delay could be taken into account) and how much time is this general BSR timer reset to after the first BSR is sent (for the following BSRs to be sent). This timer may be called, for example, GeneralBSR-Timer. After the child node receives this signalling, the corresponding timer will be started.

If the timer GeneralBSR-Timer expires, all of the IAB nodes will report a BSR to their parent node. This may be a Long BSR, if more than one logical channel group (LCG) has data available in a buffer at that IAB node for transmission when the MAC PDU containing the BSR is to be built. The Long BSR will then be reported for all LCGs which have data available for transmission to the parent node. Alternatively, if there is only one LCG with data available for transmission, the IAB node will report a Short BSR to its parent node.

In some arrangements of embodiments of the present technique, where multi-connectivity is supported, it is up to the child node to divide the current buffer status in order to report to all of its parent nodes. In other words, the child node is attached to one or more further parent nodes in addition to the one of the one or more other infrastructure equipment acting as the relay nodes or the donor node, and the child node is configured to determine relative portions of the amount of uplink data to report in BSRs transmitted to each of its parent nodes. In some arrangements of embodiments of the present technique, as shown above in accordance with, for example, FIG. 6B, some parent nodes may be attached to more than one child node. In this case, such parent nodes would have to receive BSRs from all child nodes, and provide uplink grants for each so that it can receive and aggregate data from all child nodes to relay upstream.

In some arrangements of embodiments of the present technique, additional assistance information, for example allocated uplink grant to child node if any (to indicate how much data is going to be received at this node), node load status etc., can be included together with the BSR to be sent to the parent node or sent separately in addition to BSR. In other words, the signal comprising the BSR additionally comprises assistance information for the parent node, and the parent node schedules the communications resources to the child node in accordance with the BSR and the assistance information. The assistance information may comprise an indication of an UL grant allocated by the child node to one of the communications devices or one of the infrastructure equipment, the indication of the UL grant indicating an amount of data the child node is going to receive from the one of the communications devices or the one of the infrastructure equipment. The assistance information may comprise an indication of a current load status of the child node. In some embodiments, it is not necessary that a general BSR timer is configured, although in other embodiments, the general BSR timer can be in configured in combination with these described arrangements. In an embodiment where such a general BSR timer is not configured, a wireless communications network comprises a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the parent node is configured to receive a signal comprising a BSR from the child node indicating an amount of uplink data that the child node has ready to transmit to the parent node, and to schedule, in accordance with the BSR received from the child node, communications resources of the backhaul communications link to the child node in which the child node is to transmit the uplink data, wherein the signal comprising the BSR additionally comprises assistance information for the parent node, and the parent node schedules the communications resources to the child node in accordance with the BSR and the assistance information.

Following the transmission of the BSR from the child nodes to the parent nodes, each parent node will then adjust its uplink grant allocations for its child node(s) according to the received BSR from its child nodes.

In some arrangements of embodiments of the present technique, the individual periodic timer in each IAB node (e.g. periodicBSR-Timer) which has the general BSR timer (e.g. GeneralBSR-Timer) can be set to infinite in order to further save signalling costs. In other words, a periodic BSR timer of each of the subset of the plurality of infrastructure equipment among which the general BSR timer is common and synchronised is set to an infinite value.

In some arrangements of embodiments of the present technique, the general BSR timer can be configured for high profile QoS UEs; effectively all IAB nodes on the route from its serving IAB node (gNodeB) to the IAB donor node. In other words, the subset of the plurality of infrastructure equipment among which the general BSR timer is common and synchronised is determined on the basis of the subset of the plurality of infrastructure equipment forming a communications path between the donor node and one of the communications devices, the one of the communications devices having data to transmit requiring a high quality of service. Here, this subset of infrastructure equipment may be determined by the donor node, for example.

In some arrangements of embodiments of the present technique, the general BSR timer can be configured for a certain IAB node groups (certain child-parent IAB nodes) according to, for example, the traffic load situation, or to single point nodes (one node with multiple links to downstream nodes and with only link to upstream nodes). In other words, the subset of the plurality of infrastructure equipment among which the general BSR timer is common and synchronised is determined on the basis of being part of a group of the plurality of infrastructure equipment which satisfy a predetermined condition. This predetermined condition may be a traffic load at the infrastructure equipment in the group exceeds a threshold traffic load, and/or may be that the infrastructure equipment in the group are attached to more infrastructure equipment in a downstream direction than an upstream direction. In some arrangements of embodiments of the present technique, the general BSR timer can be set with different values among different node groups. Here, this subset of infrastructure equipment which meet the predetermined condition may be determined by the donor node, or parent node, for example.

In some arrangements of embodiments of the present technique, the BSR value can be inflated (upgraded) to a higher level than according to the real buffer status. In other words, a buffer size value included within the BSR which indicates the amount of uplink data that the child node has ready to transmit to the parent node is inflated to a higher level than the real buffer size value of the child node.

TABLE I

Buffer size levels (in bytes) for 5-bit
Buffer Size field (reproduced from [9])

| Index | BS value |
|---|---|
| 0 | 0 |
| 1 | ≤10 |
| 2 | ≤14 |
| 3 | ≤20 |
| 4 | ≤28 |
| 5 | ≤38 |
| 6 | ≤53 |
| 7 | ≤74 |
| 8 | ≤102 |
| 9 | ≤142 |
| 10 | ≤198 |
| 11 | ≤276 |
| 12 | ≤384 |
| 13 | ≤535 |
| 14 | ≤745 |
| 15 | ≤1038 |
| 16 | ≤1446 |
| 17 | ≤2014 |
| 18 | ≤2806 |
| 19 | ≤3909 |
| 20 | ≤5446 |
| 21 | ≤7587 |

TABLE I-continued

Buffer size levels (in bytes) for 5-bit
Buffer Size field (reproduced from [9])

| Index | BS value |
|---|---|
| 22 | ≤10570 |
| 23 | ≤14726 |
| 24 | ≤20516 |
| 25 | ≤28581 |
| 26 | ≤39818 |
| 27 | ≤55474 |
| 28 | ≤77284 |
| 29 | ≤107669 |
| 30 | ≤150000 |
| 31 | >150000 |

For example, looking at the table above, which is reproduced from [9], the buffer size value could be set to an index of 2 implying a buffer size of <=14 although the buffer size value is actually <=10.

In some arrangements, the BSR value may be inflated (upgraded) to a higher level if it contains much high QoS profile data packets. In other words, the buffer size value is inflated based on the uplink data comprising at least some data which requires a high quality of service. The amount of inflation of the BSR value is calculated by the child node based on the estimation of arrival of new data during the intervals of BSR reporting which is not accounted for at the time of transmission of BSR. This will allow the child and intermediate nodes to meet the uplink QoS requirements and at the same time reduce buffering of data on the uplink. In some embodiments, it is not necessary that a general BSR timer is configured, although in other embodiments, the general BSR timer can be in configured in combination with these described arrangements. In an embodiment where such a general BSR timer is not configured, a wireless communications network comprises a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the parent node is configured to receive a signal comprising a BSR from the child node indicating an amount of uplink data that the child node has ready to transmit to the parent node, and to schedule, in accordance with the BSR received from the child node, communications resources of the backhaul communications link to the child node in which the child node is to transmit the uplink data, wherein a buffer size value included within the BSR which indicates the amount of uplink data that the child node has ready to transmit to the parent node is inflated to a higher level than the real buffer size value of the child node.

In some arrangements of embodiments of the present technique, the activation to send the BSRs from each of the IAB nodes can be triggered by the transmission of physical layer signalling if all the IAB nodes are synchronised. In some embodiments, it is not necessary that a general BSR timer is configured, although in other embodiments, the general BSR timer can be in configured in combination with these described arrangements In an embodiment where such a general BSR timer is not configured, a wireless communications network comprises a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the parent node is configured to transmit a signalling message comprising an indication at least some of the plurality of infrastructure equipment should transmit a Buffer Status Report, BSR, to receive, subsequent to the signalling message being received by the child node, a signal comprising a BSR from the child node indicating an amount of uplink data that the child node has ready to transmit to the parent node, and to schedule, in accordance with the BSR received from the child node, communications resources of the backhaul communications link to the child node in which the child node is to transmit the uplink data.

As described above, there are some proposals in [8] relating to pre-BSR reporting. Pre-BSR reporting is useful for delay-sensitive data transmission. However, there may be some mixing of traffic for both delay-tolerant and delay-sensitive data. In an arrangement of embodiments of the present technique, a new indicator is introduced to indicate whether a pre-BSR should be utilised if, for example, delay-tolerant data and delay-sensitive data are used for different LCGs. In other words, each of the more or more infrastructure equipment are configured to transmit, based on a received pre-BSR report masking parameter, a pre-BSR to their parent nodes subsequent to receiving a BSR from their child nodes, the pre-BSR comprising an indication of a sum of an amount of uplink data the each of the one or more of the infrastructure equipment currently has to transmit and an amount of uplink data reported by its child nodes and/or one or more communications devices served by it. If the received pre-BSR report masking parameter indicates that the one or more of the infrastructure equipment should not transmit a pre-BSR to their parent nodes subsequent to receiving a BSR from their child nodes, the method comprises transmitting, by the one or more of the infrastructure equipment the pre-BSR subsequent to expiry of the general BSR timer. Here, the pre-BSR report masking parameter may be determined by the donor node, or the parent node of the each of the one or more infrastructure equipment, for example, and may be transmitted as part of the signal containing the general BSR timer or separately signalled.

One example way of implementing this pre-BSR report masking indicator (or pre-BSR enable/allow indicator) is to utilise a Boolean flag which indicates whether the pre-BSR report should be send to the next hop node immediately, or whether a BSR report should not be transmitted until the GeneralBSR-Timer has expired. If a bitmap is applied instead of the Boolean flag, more details of masking combinations/conditions can be configured. Another example way of implementing this new indicator is that it could be a reuse of the existing Release 15 parameter logicalChannelSR-Mask. However, this parameter is originally designed for masking scheduling requests (SRs) rather than buffer status reports (BSRs), which is used when a scheduling request should be masked for an uplink semi-persistence scheduling (SPS) logical channel because the base station has knowledge of when the uplink data is coming in case of UL SPS. If both SR and BSR are able to be masked with the same parameter, this could be reused. Otherwise, a separate and specific parameter should be used.

In some embodiments relating to the pre-BSR report masking indicator, it is not necessary that a general BSR timer is configured, although in other embodiments, the general BSR timer can be in configured in combination with these described arrangements. In an embodiment where such a general BSR timer is not configured, a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the parent node is configured to receive a signal comprising a BSR from the child node indicating an amount of uplink data that the child node has ready to transmit to the parent node, and to schedule, in accordance with the BSR received from the child node, communications resources of the backhaul communications link to the child node in which the child node is to transmit the uplink data, and each of the one or more of the infrastructure equipment are configured to transmit, based on a received pre-BSR report masking parameter, a pre-BSR to their parent nodes subsequent to receiving a BSR from their child nodes, the pre-BSR comprising an indication of a sum of an amount of uplink data the each of the one or more of the infrastructure equipment currently has to transmit and an amount of uplink data reported by its child nodes and/or one or more communications devices served by it.

As described above, by way of FIG. 11 and the associated discussion, it is proposed in [7] that an IAB node can provide its scheduling timing information when it sends a BSR to its parent node, though this is inefficient in terms of increased signalling overheads and coordination complexity. In an arrangement of embodiments of the present technique, a case is considered where the parent IAB node does not schedule an uplink grant for the child node to transmit uplink data immediately on reception of a BSR. Generally, a UE should send delay sensitive data as soon as it receives an uplink grant, and this should be rippled through the IAB network until the data reaches the core network, but there are some possible reasons that it may be delayed. For example, the UE or one of the IAB nodes may be in poor coverage conditions, where one transmission takes a longer time due to, for example, repetitions or TTI bundling. Alternatively, it may be the case that the parent IAB node is handling higher priority traffic than this child node has to transmit. In this case, the child node should not send a BSR immediately to its parent node. The child node may hold off on the transmission of high priority data until a certain condition has been met (e.g. amount of transferred data or time), before it is allowed to send a BSR to its parent node. The arrangement of pre-BSR report masking as discussed above could be useful for this arrangement. Alternatively, the child node does not have enough transmission power headroom to transmit data on the uplink. In this case, it is not so easy to know when the uplink transmission from the child node to the parent node is finished. The parent node should wait for a good opportunity where there is enough power head room (PHR) available at the child node. The child node can then transmit uplink data to the parent node when the requisite transmission power is available.

In this arrangement therefore, an IAB node should indicate a status of there being little PHR at its child node to its parent node in addition to providing its own BSR. When the parent node of this IAB node receives this indicated status, the parent node will not allocate the resources for the uplink transmission immediately, but will instead await the clearance of the PHR issue at the IAB node's child node. The IAB node may send the PHR status of its child node again when it is cleared. Then, parent node allocates the resources for the uplink transmission to the IAB node. In other words, the signal comprising the BSR additionally comprises a power headroom status of the child node. The parent node is configured to determine that the power headroom status of the child node is below a power headroom threshold status, and consequently to withhold transmission of the scheduled communications resources of the backhaul communications link to the child node in which the child node is to transmit the uplink data while the power headroom status is below the power headroom threshold status.

In some embodiments relating to the power headroom status, it is not necessary that a general BSR timer is configured, although in other embodiments, the general BSR timer can be in configured in combination with these described arrangements. In an embodiment where such a general BSR timer is not configured, a wireless communications network comprises a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the parent node is configured to receive a signal comprising a BSR from the child node indicating an amount of uplink data that the child node has ready to transmit to the parent node, and to schedule, in accordance with the BSR received from the child node, communications resources of the backhaul communications link to the child node in which the child node is to transmit the uplink data, wherein the signal comprising the BSR additionally comprises a power headroom status of the child node.

Flow Chart Representation

Figure 13:
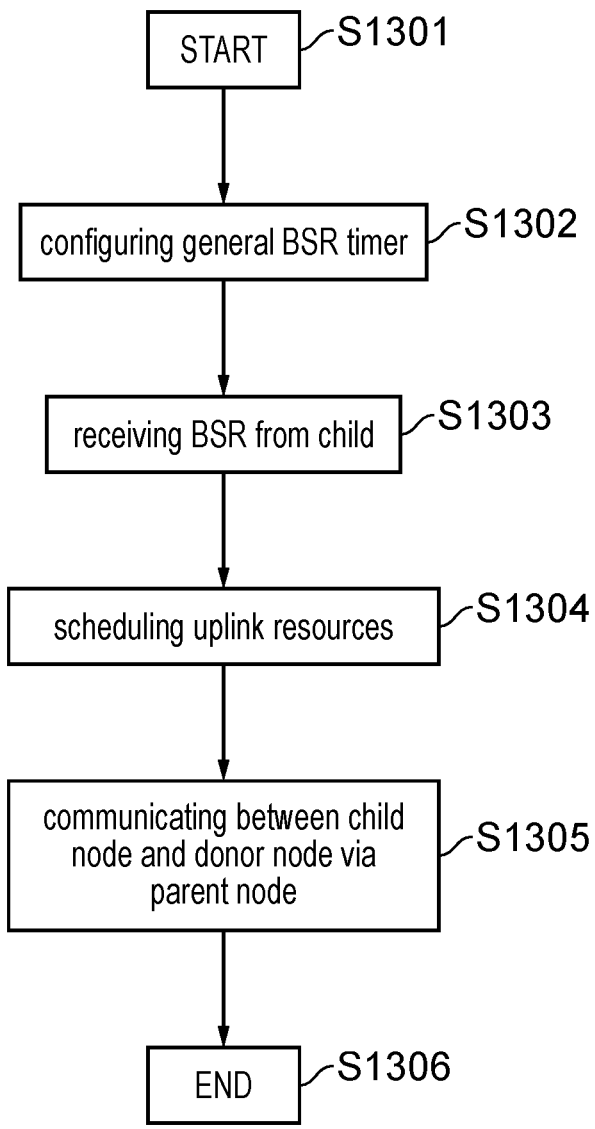
FIG. 13 shows a flow diagram illustrating a process of communications in a communications system in accordance with embodiments of the present technique.

FIG. 13 shows a flow diagram illustrating a process of communications in a communications system in accordance with embodiments of the present technique. The process shown by FIG. 13 is a method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link.

The method begins in step S1301. The method comprises, in step S1302, configuring, by one of a first of the infrastructure equipment acting as a donor node connected to a core network part of the wireless communications network and a parent node which is one the donor node and one of one or more others of the infrastructure equipment acting as relay nodes, a general Buffer Status Report, BSR, timer for a child node which is a second of the infrastructure equipment, the child node being attached to the parent node the and the parent node being configured to allocate uplink communications resources to the child node, the general BSR timer being common and synchronised among at least a subset of the plurality of infrastructure equipment. This configuration of the general BSR timer may take place upon attachment of the child node to the parent node, and may be followed by the parent node transmitting an indication of the timer to the child node using RRC signalling for example. The process then moves to step S1303, which comprises receiving, at the parent node, subsequent to expiry of the general BSR timer, a signal comprising a BSR from the child node indicating an amount of uplink data that the child node has ready to transmit to the parent node. In step S1304, the process comprises scheduling, by the parent node, in accordance with the BSR received from the child node, communications resources of the backhaul communications link to the child node in which the child node is to transmit the uplink data. This allocation of resources may then be signalled to the child node by the parent node in an uplink grant. The method then moves to step S1305, which comprises transmitting, to the donor node, data (i.e. the uplink data in the scheduled communications resources of the backhaul communications link) by the child node via the parent node. The process ends in step S1306.

Those skilled in the art would appreciate that the method shown by FIG. 13 may be adapted in accordance with embodiments of the present technique. For example, other intermediate steps may be included in the method, or the steps may be performed in any logical order.

Though embodiments of the present technique have been described largely by way of the example system shown in FIG. 12, it would be clear to those skilled in the art that they could be equally applied to other systems, where for example there may be many more nodes or paths to choose from, or more hops between the donor and end nodes.

Those skilled in the art would also appreciate that such infrastructure equipment and/or wireless communications networks as herein defined may be further defined in accordance with the various arrangements and embodiments discussed in the preceding paragraphs. It would be further appreciated by those skilled in the art that such infrastructure equipment and wireless communications networks as herein defined and described may form part of communications systems other than those defined by the present invention.

Those skilled in the art would further appreciate that, although some embodiments have been described and/or defined by way of an overall system apparatus or method comprising multiple different infrastructure equipment, such embodiments may be defined in relation to just one of the infrastructure equipment (e.g. donor node, child node, intermediate IAB parent node) of such an overall system.

The following numbered paragraphs provide further example aspects and features of the present technique:

Paragraph 1. A method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, the method comprising transmitting, to a first of the infrastructure equipment acting as a donor node connected to a core network part of the wireless communications network, data by a second of the infrastructure equipment via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the transmitting the data by the child node to the donor node, configuring, by one of the parent node and the donor node, a general Buffer Status Report, BSR, timer for the child node, the general BSR timer being common and synchronised among at least a subset of the plurality of infrastructure equipment, receiving, at the parent node, subsequent to expiry of the general BSR timer, a signal comprising a BSR from the child node indicating an amount of uplink data that the child node has ready to transmit to the parent node, and scheduling, by the parent node, in accordance with the BSR received from the child node, communications resources of the backhaul communications link to the child node in which the child node is to transmit the uplink data.

Paragraph 2. A method according to Paragraph 1, wherein the general BSR timer is configured by the parent node subsequent to the child node attaching to parent node and transmitted by the parent node to the child node subsequent to being configured to by the parent node.

Paragraph 3. A method according to Paragraph 1 or Paragraph 2, wherein the general BSR timer is configured by the parent node using Radio Resource Control, RRC, signalling transmitted to the child node.

Paragraph 4. A method according to any of Paragraphs 1 to 3, wherein the general BSR timer is common and synchronised among all of the plurality of infrastructure equipment.

Paragraph 5. A method according to any of Paragraphs 1 to 4, wherein the signal comprising the BSR additionally comprises assistance information for the parent node, and the parent node schedules the communications resources to the child node in accordance with the BSR and the assistance information.

Paragraph 6. A method according to Paragraph 5, wherein the assistance information comprises an indication of an UL grant allocated by the child node to one of the communications devices or one of the infrastructure equipment, the indication of the UL grant indicating an amount of data the child node is going to receive from the one of the communications devices or the one of the infrastructure equipment.

Paragraph 7. A method according to Paragraph 5 or Paragraph 6, wherein the assistance information comprises an indication of a current load status of the child node.

Paragraph 8. A method according to any of Paragraphs 1 to 7, wherein the parent node is attached to one or more further child nodes in addition to the second infrastructure equipment.

Paragraph 9. A method according to any of Paragraphs 1 to 8, wherein the child node is attached to one or more further parent nodes in addition to the one of the one or more other infrastructure equipment acting as the relay nodes or the donor node, and the method comprises determining, by the child node, relative portions of the amount of uplink data to report in BSRs transmitted to each of its parent nodes.

Paragraph 10. A method according to any of Paragraphs 1 to 9, wherein a periodic BSR timer of each of the subset of the plurality of infrastructure equipment among which the general BSR timer is common and synchronised is set to an infinite value.

Paragraph 11. A method according to any of Paragraphs 1 to 10, wherein the subset of the plurality of infrastructure equipment among which the general BSR timer is common and synchronised is determined on the basis of the subset of the plurality of infrastructure equipment forming a communications path between the donor node and one of the communications devices, the one of the communications devices having data to transmit requiring a high quality of service.

Paragraph 12. A method according to any of Paragraphs 1 to 11, wherein the subset of the plurality of infrastructure equipment among which the general BSR timer is common and synchronised is determined on the basis of being part of a group of the plurality of infrastructure equipment which satisfy a predetermined condition.

Paragraph 13. A method according to Paragraph 12, wherein the predetermined condition is a traffic load at the infrastructure equipment in the group exceeds a threshold traffic load.

Paragraph 14. A method according to Paragraph 12 or Paragraph 12, wherein the predetermined condition is that the infrastructure equipment in the group are attached to more infrastructure equipment in a downstream direction than an upstream direction.

Paragraph 15. A method according to any of Paragraphs 12 to 14, wherein the general BSR timer is set to have different values among different groups of the plurality of infrastructure equipment.

Paragraph 16. A method according to any of Paragraphs 1 to 15, wherein a buffer size value included within the BSR which indicates the amount of uplink data that the child node has ready to transmit to the parent node is inflated to a higher level than the real buffer size value of the child node.

Paragraph 17. A method according to Paragraph 16, wherein the buffer size value is inflated based on the uplink data comprising at least some data which requires a high quality of service.

Paragraph 18. A method according to any of Paragraphs 1 to 17, the method comprises transmitting, by each of one or more of the infrastructure equipment, based on a received pre-BSR report masking parameter, a pre-BSR to their parent nodes subsequent to receiving a BSR from their child nodes, the pre-BSR comprising an indication of a sum of an amount of uplink data the each of the one or more of the infrastructure equipment currently has to transmit and an amount of uplink data reported by its child nodes and/or one or more communications devices served by it.

Paragraph 19. A method according to Paragraph 18, wherein if the received pre-BSR report masking parameter indicates that the one or more of the infrastructure equipment should not transmit a pre-BSR to their parent nodes subsequent to receiving a BSR from their child nodes, the method comprises transmitting, by the one or more of the infrastructure equipment the pre-BSR subsequent to expiry of the general BSR timer.

Paragraph 20. A method according to any of Paragraphs 1 to 19, wherein the signal comprising the BSR additionally comprises a power headroom status of the child node.

Paragraph 21. A method according to Paragraph 20, comprising
- determining, by the parent node, that the power headroom status of the child node is below a power headroom threshold status, and
- withholding transmission of the scheduled communications resources of the backhaul communications link to the child node in which the child node is to transmit the uplink data while the power headroom status is below the power headroom threshold status.

Paragraph 22. A wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured
- to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein one of the parent node or the donor node is configured, in advance of the transmitting the data by the child node to the donor node,
- to configure a general Buffer Status Report, BSR, timer for the child node, the general BSR timer being common and synchronised among at least a subset of the plurality of infrastructure equipment, and wherein the parent node is configured
- to receive, subsequent to expiry of the general BSR timer, a signal comprising a BSR from the child node indicating an amount of uplink data that the child node has ready to transmit to the parent node, and
- to schedule, in accordance with the BSR received from the child node, communications resources of the backhaul communications link to the child node in which the child node is to transmit the uplink data.

Paragraph 23. Circuitry for a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured
- to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein one of the parent node or the donor node is configured, in advance of the transmitting the data by the child node to the donor node,
- to configure a general Buffer Status Report, BSR, timer for the child node, the general BSR timer being common and synchronised among at least a subset of the plurality of infrastructure equipment, and wherein the parent node is configured
- to receive, subsequent to expiry of the general BSR timer, a signal comprising a BSR from the child node indicating an amount of uplink data that the child node has ready to transmit to the parent node, and
- to schedule, in accordance with the BSR received from the child node, communications resources of the backhaul communications link to the child node in which the child node is to transmit the uplink data.

Paragraph 24. A method of operating a first infrastructure equipment forming part of a wireless communications network comprising a plurality of other infrastructure equipment, the first infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, wherein the first of the infrastructure equipment acts as a donor node connected to a core network part of the wireless communications network, the method comprising
- receiving data from a second of the infrastructure equipment via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the receiving the data from the child node,
- configuring a Buffer Status Report, general BSR timer for the child node, the general BSR timer being common and synchronised among at least a subset of the plurality of infrastructure equipment,
- receiving, subsequent to expiry of the general BSR timer, a signal comprising a BSR from the child node indicating an amount of uplink data that the child node has ready to transmit to the parent node, and
- scheduling, in accordance with the BSR received from the child node, communications resources of the backhaul communications link to the child node in which the child node is to transmit the uplink data.

Paragraph 25. A first infrastructure equipment forming part of a wireless communications network comprising a plurality of other infrastructure equipment, the first infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, wherein the first of the infrastructure equipment acts as a donor node connected to a core network part of the wireless communications network and comprises transceiver circuitry and controller circuitry configured in combination to receive data from a second of the infrastructure equipment via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the first infrastructure equipment is configured, in advance of receiving the data from the child node, to configure a general Buffer Status Report, BSR, timer for the child node, the general BSR timer being common and synchronised among at least a subset of the plurality of infrastructure equipment, to receive, subsequent to expiry of the general BSR timer, a signal comprising a BSR from the child node indicating an amount of uplink data that the child node has ready to transmit to the parent node, and to schedule, in accordance with the BSR received from the child node, communications resources of the backhaul communications link to the child node in which the child node is to transmit the uplink data.

Paragraph 26. Circuitry for a first infrastructure equipment forming part of a wireless communications network comprising a plurality of other infrastructure equipment, the first infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, wherein the first of the infrastructure equipment acts as a donor node connected to a core network part of the wireless communications network and comprises transceiver circuitry and controller circuitry configured in combination to receive data from a second of the infrastructure equipment via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the first infrastructure equipment is configured, in advance of receiving the data from the child node, to configure a general Buffer Status Report, BSR, timer for the child node, the general BSR timer being common and synchronised among at least a subset of the plurality of infrastructure equipment, to receive, subsequent to expiry of the general BSR timer, a signal comprising a BSR from the child node indicating an amount of uplink data that the child node has ready to transmit to the parent node, and to schedule, in accordance with the BSR received from the child node, communications resources of the backhaul communications link to the child node in which the child node is to transmit the uplink data.

Paragraph 27. A method of operating an infrastructure equipment acting as a relay node forming part of a wireless communications network comprising a plurality of other infrastructure equipment, the infrastructure equipment acting as the relay node and the plurality of other infrastructure equipment each being configured to communicate with one or more others of the infrastructure equipment via a backhaul communications link, one or more of the infrastructure equipment each being configured to communicate with one or more communications devices via an access link, the method comprising relaying data from a second of the infrastructure equipment to a first of the infrastructure equipment, the first infrastructure equipment acting as a donor node connected to a core network part of the wireless communications network, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the relaying the data from the child node to the donor node, configuring a general Buffer Status Report, BSR, timer for the child node, the general BSR timer being common and synchronised among at least a subset of the plurality of infrastructure equipment, receiving, subsequent to expiry of the general BSR timer, a signal comprising a BSR from the child node indicating an amount of uplink data that the child node has ready to transmit to the parent node, and scheduling, in accordance with the BSR received from the child node, communications resources of the backhaul communications link to the child node in which the child node is to transmit the uplink data.

Paragraph 28. An infrastructure equipment acting as a relay node forming part of a wireless communications network comprising a plurality of other infrastructure equipment, the infrastructure equipment acting as the relay node and the plurality of other infrastructure equipment each being configured to communicate with one or more others of the infrastructure equipment via a backhaul communications link, one or more of the infrastructure equipment each being configured to communicate with one or more communications devices via an access link, the infrastructure equipment acting as the relay node comprising transceiver circuitry and controller circuitry configured in combination relaying data from a second of the infrastructure equipment to a first of the infrastructure equipment, the first infrastructure equipment acting as a donor node connected to a core network part of the wireless communications network, the second infrastructure equipment being a child node and one of the one or more other infrastructure equipment acting as the relay nodes or the donor node being a parent node to which the child node is attached, the parent node being configured to allocate uplink communications resources to the child node, wherein the infrastructure equipment acting as the relay node is configured, in advance of the relaying the data from the child node to the donor node, configuring a general Buffer Status Report, BSR, timer for the child node, the general BSR timer being common and synchronised among at least a subset of the plurality of infrastructure equipment, receiving, subsequent to expiry of the general BSR timer, a signal comprising a BSR from the child node indicating an amount of uplink data that the child node has ready to transmit to the parent node, and scheduling, in accordance with the BSR received from the child node, communications resources of the backhaul communications link to the child node in which the child node is to transmit the uplink data.

Paragraph 29. Circuitry for an infrastructure equipment acting as a relay node forming part of a wireless communications network comprising a plurality of other infrastructure equipment, the infrastructure equipment acting as the relay node and the plurality of other infrastructure equipment each being configured to communicate with one or more others of the infrastructure equipment via a backhaul communications link, one or more of the infrastructure equipment each being configured to communicate with one or more communications devices via an access link, the infrastructure equipment acting as the relay node comprising transceiver circuitry and controller circuitry configured in combination relaying data from a second of the infrastructure equipment to a first of the infrastructure equipment, the first infrastructure equipment acting as a donor node connected to a core network part of the wireless communications network, the second infrastructure equipment being a child node and one of the one or more other infrastructure equipment acting as the relay nodes or the donor node being a parent node to which the child node is attached, the parent node being configured to allocate uplink communications resources to the child node, wherein the infrastructure equipment acting as the relay node is configured, in advance of the relaying the data from the child node to the donor node, configuring a general Buffer Status Report, BSR, timer for the child node, the general BSR timer being common and synchronised among at least a subset of the plurality of infrastructure equipment, receiving, subsequent to expiry of the general BSR timer, a signal comprising a BSR from the child node indicating an amount of uplink data that the child node has ready to transmit to the parent node, and scheduling, in accordance with the BSR received from the child node, communications resources of the backhaul communications link to the child node in which the child node is to transmit the uplink data.

Paragraph 30. A method of operating a second infrastructure equipment forming part of a wireless communications network comprising a plurality of other infrastructure equipment, the second infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, the method comprising transmitting, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the transmitting the data to the donor node, receiving, from the parent node, a configured general Buffer Status Report, BSR, timer, the general BSR timer being common and synchronised among at least a subset of the plurality of infrastructure equipment, transmitting, to the parent node, subsequent to expiry of the general BSR timer, a signal comprising a BSR indicating an amount of uplink data that the second infrastructure equipment has ready to transmit to the parent node, and receiving, from the parent node, in accordance with the BSR transmitted by second infrastructure equipment, an indication of scheduled communications resources of the backhaul communications link in which the second infrastructure equipment is to transmit the uplink data.

Paragraph 31. A second infrastructure equipment forming part of a wireless communications network comprising a plurality of other infrastructure equipment, the second infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, the second infrastructure equipment comprising transceiver circuitry and controller circuitry configured in combination to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the second infrastructure equipment is configured, in advance of the transmitting the data to the donor node, to receive, from the parent node, a configured general Buffer Status Report, BSR, timer, the general BSR timer being common and synchronised among at least a subset of the plurality of infrastructure equipment, to transmit, to the parent node, subsequent to expiry of the general BSR timer, a signal comprising a BSR indicating an amount of uplink data that the second infrastructure equipment has ready to transmit to the parent node, and to receive, from the parent node, in accordance with the BSR transmitted by second infrastructure equipment, an indication of scheduled communications resources of the backhaul communications link in which the second infrastructure equipment is to transmit the uplink data.

Paragraph 32. Circuitry for a second infrastructure equipment forming part of a wireless communications network comprising a plurality of other infrastructure equipment, the second infrastructure equipment and the plurality of other infrastructure equipment each being configured to communicate with one or more others of the infrastructure equipment via a backhaul communications link, one or more of the infrastructure equipment each being configured to communicate with one or more communications devices via an access link, the second infrastructure equipment comprising transceiver circuitry and controller circuitry configured in combination to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the second infrastructure equipment is configured, in advance of the transmitting the data to the donor node, to receive, from the parent node, a configured general Buffer Status Report, BSR, timer, the general BSR timer being common and synchronised among at least a subset of the plurality of infrastructure equipment, to transmit, to the parent node, subsequent to expiry of the general BSR timer, a signal comprising a BSR indicating an amount of uplink data that the second infrastructure equipment has ready to transmit to the parent node, and to receive, from the parent node, in accordance with the BSR transmitted by second infrastructure equipment, an indication of scheduled communications resources of the backhaul communications link in which the second infrastructure equipment is to transmit the uplink data.

Paragraph 33. A method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, the method comprising transmitting, to a first of the infrastructure equipment acting as a donor node connected to a core network part of the wireless communications network, data by a second of the infrastructure equipment via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the transmitting the data by the child node to the donor node, receiving, at the parent node, a signal comprising a Buffer Status Report, BSR from the child node indicating an amount of uplink data that the child node has ready to transmit to the parent node, and scheduling, by the parent node, in accordance with the BSR received from the child node, communications resources of the backhaul communications link to the child node in which the child node is to transmit the uplink data, wherein the signal comprising the BSR additionally comprises assistance information for the parent node, and the parent node schedules the communications resources to the child node in accordance with the BSR and the assistance information.

Paragraph 34. A method according to Paragraph 33, wherein the assistance information comprises an indication of an UL grant allocated by the child node to one of the communications devices or one of the infrastructure equipment, the indication of the UL grant indicating an amount of data the child node is going to receive from the one of the communications devices or the one of the infrastructure equipment.

Paragraph 35. A method according to Paragraph 33 or Paragraph 34, wherein the assistance information comprises an indication of a current load status of the child node.

Paragraph 36. A method according to any of Paragraphs 33 to 35, wherein the signal comprising the BSR additionally comprises a power headroom status of the child node.

Paragraph 37. A method according to Paragraph 36, comprising determining, by the parent node, that the power headroom status of the child node is below a power headroom threshold status, and withholding transmission of the scheduled communications resources of the backhaul communications link to the child node in which the child node is to transmit the uplink data while the power headroom status is below the power headroom threshold status.

Paragraph 38 A wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the parent node is configured to receive a signal comprising a BSR from the child node indicating an amount of uplink data that the child node has ready to transmit to the parent node, and to schedule, in accordance with the BSR received from the child node, communications resources of the backhaul communications link to the child node in which the child node is to transmit the uplink data, wherein the signal comprising the BSR additionally comprises assistance information for the parent node, and the parent node schedules the communications resources to the child node in accordance with the BSR and the assistance information.

Paragraph 39 Circuitry for a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the parent node is configured to receive a signal comprising a BSR from the child node indicating an amount of uplink data that the child node has ready to transmit to the parent node, and to schedule, in accordance with the BSR received from the child node, communications resources of the backhaul communications link to the child node in which the child node is to transmit the uplink data, wherein the signal comprising the BSR additionally comprises assistance information for the parent node, and the parent node schedules the communications resources to the child node in accordance with the BSR and the assistance information.

Paragraph 40. A method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, the method comprising transmitting, to a first of the infrastructure equipment acting as a donor node connected to a core network part of the wireless communications network, data by a second of the infrastructure equipment via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the transmitting the data by the child node to the donor node, receiving, at the parent node, a signal comprising a Buffer Status Report, BSR from the child node indicating an amount of uplink data that the child node has ready to transmit to the parent node, and scheduling, by the parent node, in accordance with the BSR received from the child node, communications resources of the backhaul communications link to the child node in which the child node is to transmit the uplink data, wherein a buffer size value included within the BSR which indicates the amount of uplink data that the child node has ready to transmit to the parent node is inflated to a higher level than the real buffer size value of the child node.

Paragraph 41. A method according to Paragraph 40, wherein the buffer size value is inflated based on the uplink data comprising at least some data which requires a high quality of service.

Paragraph 42 A wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the parent node is configured to receive a signal comprising a BSR from the child node indicating an amount of uplink data that the child node has ready to transmit to the parent node, and to schedule, in accordance with the BSR received from the child node, communications resources of the backhaul communications link to the child node in which the child node is to transmit the uplink data, wherein a buffer size value included within the BSR which indicates the amount of uplink data that the child node has ready to transmit to the parent node is inflated to a higher level than the real buffer size value of the child node.

Paragraph 43 Circuitry for a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the parent node is configured to receive a signal comprising a BSR from the child node indicating an amount of uplink data that the child node has ready to transmit to the parent node, and to schedule, in accordance with the BSR received from the child node, communications resources of the backhaul communications link to the child node in which the child node is to transmit the uplink data, wherein a buffer size value included within the BSR which indicates the amount of uplink data that the child node has ready to transmit to the parent node is inflated to a higher level than the real buffer size value of the child node.

Paragraph 44. A method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, the method comprising transmitting, to a first of the infrastructure equipment acting as a donor node connected to a core network part of the wireless communications network, data by a second of the infrastructure equipment via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the transmitting the data by the child node to the donor node, transmitting, by the parent node, a signalling message comprising an indication at least some of the plurality of infrastructure equipment should transmit a Buffer Status Report, BSR, receiving, at the parent node, subsequent to the signalling message being received by the child node, a signal comprising a BSR from the child node indicating an amount of uplink data that the child node has ready to transmit to the parent node, and scheduling, by the parent node, in accordance with the BSR received from the child node, communications resources of the backhaul communications link to the child node in which the child node is to transmit the uplink data.

Paragraph 45 A wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the parent node is configured to transmit a signalling message comprising an indication at least some of the plurality of infrastructure equipment should transmit a Buffer Status Report, BSR, to receive, subsequent to the signalling message being received by the child node, a signal comprising a BSR from the child node indicating an amount of uplink data that the child node has ready to transmit to the parent node, and to schedule, in accordance with the BSR received from the child node, communications resources of the backhaul communications link to the child node in which the child node is to transmit the uplink data.

Paragraph 46 Circuitry for a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the parent node is configured to transmit a signalling message comprising an indication at least some of the plurality of infrastructure equipment should transmit a Buffer Status Report, BSR, to receive, subsequent to the signalling message being received by the child node, a signal comprising a BSR from the child node indicating an amount of uplink data that the child node has ready to transmit to the parent node, and to schedule, in accordance with the BSR received from the child node, communications resources of the backhaul communications link to the child node in which the child node is to transmit the uplink data.

Paragraph 47. A method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, the method comprising transmitting, to a first of the infrastructure equipment acting as a donor node connected to a core network part of the wireless communications network, data by a second of the infrastructure equipment via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the transmitting the data by the child node to the donor node, receiving, at the parent node, a signal comprising a Buffer Status Report, BSR from the child node indicating an amount of uplink data that the child node has ready to transmit to the parent node, scheduling, by the parent node, in accordance with the BSR received from the child node, communications resources of the backhaul communications link to the child node in which the child node is to transmit the uplink data, and transmitting, by each of one or more of the infrastructure equipment, based on a received pre-BSR report masking parameter, a pre-BSR to their parent nodes subsequent to receiving a BSR from their child nodes, the pre-BSR comprising an indication of a sum of an amount of uplink data the each of the one or more of the infrastructure equipment currently has to transmit and an amount of uplink data reported by its child nodes and/or one or more communications devices served by it.

Paragraph 48 A wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the parent node is configured to receive a signal comprising a BSR from the child node indicating an amount of uplink data that the child node has ready to transmit to the parent node, and to schedule, in accordance with the BSR received from the child node, communications resources of the backhaul communications link to the child node in which the child node is to transmit the uplink data, and each of the one or more of the infrastructure equipment are configured to transmit, based on a received pre-BSR report masking parameter, a pre-BSR to their parent nodes subsequent to receiving a BSR from their child nodes, the pre-BSR comprising an indication of a sum of an amount of uplink data the each of the one or more of the infrastructure equipment currently has to transmit and an amount of uplink data reported by its child nodes and/or one or more communications devices served by it.

Paragraph 49 Circuitry for a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, wherein a second of the infrastructure equipment is configured to transmit, to a first of the infrastructure equipment acting as a donor node connected to a core network part of the wireless communications network, data via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the parent node is configured to receive a signal comprising a BSR from the child node indicating an amount of uplink data that the child node has ready to transmit to the parent node, and to schedule, in accordance with the BSR received from the child node, communications resources of the backhaul communications link to the child node in which the child node is to transmit the uplink data, and each of the one or more of the infrastructure equipment are configured to transmit, based on a received pre-BSR report masking parameter, a pre-BSR to their parent nodes subsequent to receiving a BSR from their child nodes, the pre-BSR comprising an indication of a sum of an amount of uplink data the each of the one or more of the infrastructure equipment currently has to transmit and an amount of uplink data reported by its child nodes and/or one or more communications devices served by it.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.

[2] RP-161901, "Revised work item proposal: Enhancements of NB-IoT", Huawei, HiSilicon, 3GPP TSG RAN Meeting #73, New Orleans, USA, Sep. 19-22, 2016.

[3] RP-170831, "New SID Proposal: Study on Integrated Access and Backhaul for NR", AT&T, 3GPP RAN Meeting #75, Dubrovnik, Croatia, March 2017.

[4] 3GPP TR 38.874, "$3^{rd}$ Generation Partnership Project; Technical Specification Group Radio Access Network; Study on Integrated Access and Backhaul; (Release 15)", $3^{rd}$ Generation Partnership Project, February 2018.

[5] R2-1801606, "Proposals on IAB Architecture", Qualcomm et al, 3GPP TSG-RAN WG2 NR Ad hoc 1801, Vancouver, Canada, Jan. 22-26, 2018.

[6] R3-181502, "Way Forward—IAB Architecture for L2/3 relaying", Qualcomm et al, 3GPP TSG-RAN WG3 Meeting #99, Athens, Greece, Feb. 26-Mar. 2, 2018.

[7] R2-1812638, "Scheduling Enhancement in IAB", LG Electronics Inc., 3GPP TSG-RAN WG2 Meeting #103, Gothenburg, Sweden, Aug. 20-24, 2018.

[8] R2-1812881, "Pre-BSR Enabling Fast Scheduling", Huawei, HiSilicon, 3GPP TSG-RAN WG2 Meeting #103, Gothenburg, Sweden, Aug. 20-24, 2018.

[9] 3GPP TS 38.321, "$3^{rd}$ Generation Partnership Project; Technical Specification Group Radio Access Network; NR; Medium Access Control (MAC) protocol specification (Release 15)", $3^{rd}$ Generation Project Partnership, June 2018.

What is claimed is:

1. A method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, the method comprising transmitting, to a first of the infrastructure equipment acting as a donor node connected to a core network part of the wireless communications network, data by a second of the infrastructure equipment via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the transmitting the data by the child node to the donor node, configuring, by one of the parent node and the donor node, a general Buffer Status Report, BSR, timer for the child node, the general BSR timer being common and synchronised among at least a subset of the plurality of infrastructure equipment, receiving, at the parent node, subsequent to expiry of the general BSR timer, a signal comprising a BSR from the child node indicating an amount of uplink data that the child node has ready to transmit to the parent node, and scheduling, by the parent node, in accordance with the BSR received from the child node, communications resources of the backhaul communications link to the child node in which the child node is to transmit the uplink data.

2. A method according to claim 1, wherein the general BSR timer is configured by the parent node subsequent to the child node attaching to parent node and transmitted by the parent node to the child node subsequent to being configured to by the parent node.

3. A method according to claim 1, wherein the general BSR timer is configured by the parent node using Radio Resource Control, RRC, signalling transmitted to the child node.

4. A method according to claim 1, wherein the general BSR timer is common and synchronised among all of the plurality of infrastructure equipment.

5. A method according to claim 1, wherein the signal comprising the BSR additionally comprises assistance information for the parent node, and the parent node schedules the communications resources to the child node in accordance with the BSR and the assistance information.

6. A method according to claim 5, wherein the assistance information comprises an indication of an UL grant allocated by the child node to one of the communications devices or one of the infrastructure equipment, the indication of the UL grant indicating an amount of data the child node is going to receive from the one of the communications devices or the one of the infrastructure equipment.

7. A method according to claim 5, wherein the assistance information comprises an indication of a current load status of the child node.

8. A method according to claim 1, wherein the parent node is attached to one or more further child nodes in addition to the second infrastructure equipment.

9. A method according to claim 1, wherein the child node is attached to one or more further parent nodes in addition to the one of the one or more other infrastructure equipment acting as the relay nodes or the donor node, and the method comprises determining, by the child node, relative portions of the amount of uplink data to report in BSRs transmitted to each of its parent nodes.

10. A method according to claim 1, wherein a periodic BSR timer of each of the subset of the plurality of infrastructure equipment among which the general BSR timer is common and synchronised is set to an infinite value.

11. A method according to claim 1, wherein the subset of the plurality of infrastructure equipment among which the general BSR timer is common and synchronised is determined on the basis of the subset of the plurality of infrastructure equipment forming a communications path between the donor node and one of the communications devices, the one of the communications devices having data to transmit requiring a high quality of service.

12. A method according to claim 1, wherein the subset of the plurality of infrastructure equipment among which the general BSR timer is common and synchronised is determined on the basis of being part of a group of the plurality of infrastructure equipment which satisfy a predetermined condition.

13. A method according to claim 12, wherein the predetermined condition is a traffic load at the infrastructure equipment in the group exceeds a threshold traffic load.

14. A method according to claim 12, wherein the predetermined condition is that the infrastructure equipment in the group are attached to more infrastructure equipment in a downstream direction than an upstream direction.

15. A method according to claim 12, wherein the general BSR timer is set to have different values among different groups of the plurality of infrastructure equipment.

16. A method according to claim 1, wherein a buffer size value included within the BSR which indicates the amount of uplink data that the child node has ready to transmit to the parent node is inflated to a higher level than the real buffer size value of the child node.

17. A method according to claim 1, the method comprises transmitting, by each of one or more of the infrastructure equipment, based on a received pre-BSR report masking parameter, a pre-BSR to their parent nodes subsequent to receiving a BSR from their child nodes, the pre-BSR comprising an indication of a sum of an amount of uplink data the each of the one or more of the infrastructure equipment currently has to transmit and an amount of uplink data reported by its child nodes and/or one or more communications devices served by it.

18. A method according to claim 1, wherein the signal comprising the BSR additionally comprises a power headroom status of the child node.

19. A method of operating an infrastructure equipment acting as a relay node forming part of a wireless communications network comprising a plurality of other infrastructure equipment, the infrastructure equipment acting as the relay node and the plurality of other infrastructure equipment each being configured to communicate with one or more others of the infrastructure equipment via a backhaul communications link, one or more of the infrastructure equipment each being configured to communicate with one or more communications devices via an access link, the method comprising relaying data from a second of the infrastructure equipment to a first of the infrastructure equipment, the first infrastructure equipment acting as a donor node connected to a core network part of the wireless communications network, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the relaying the data from the child node to the donor node, configuring a general Buffer Status Report, BSR, timer for the child node, the general BSR timer being common and synchronised among at least a subset of the plurality of infrastructure equipment, receiving, subsequent to expiry of the general BSR timer, a signal comprising a BSR from the child node indicating an amount of uplink data that the child node has ready to transmit to the parent node, and scheduling, in accordance with the BSR received from the child node, communications resources of the backhaul communications link to the child node in which the child node is to transmit the uplink data.

20. A method of controlling communications within a wireless communications network comprising a plurality of infrastructure equipment each being configured to communicate with one or more others of the infrastructure equipment via a backhaul communications link, one or more of the infrastructure equipment each being configured to communicate with one or more communications devices via an access link, the method comprising transmitting, to a first of the infrastructure equipment acting as a donor node connected to a core network part of the wireless communications network, data by a second of the infrastructure equipment via one or more others of the infrastructure equipment acting as relay nodes, the second infrastructure equipment being a child node and one of the one or more other infrastructure equipment acting as the relay nodes or the donor node being a parent node to which the child node is attached, the parent node being configured to allocate uplink communications resources to the child node, wherein the method comprises, in advance of the transmitting the data by the child node to the donor node, receiving, at the parent node, a signal comprising a Buffer Status Report, BSR from the child node indicating an amount of uplink data that the child node has ready to transmit to the parent node, and scheduling, by the parent node, in accordance with the BSR received from the child node, communications resources of the backhaul communications link to the child node in which the child node is to transmit the uplink data, wherein the signal comprising the BSR additionally comprises assistance information for the parent node, and the parent node schedules the communications resources to the child node in accordance with the BSR and the assistance information.

\* \* \* \* \*